United States Patent
Arai

(10) Patent No.: US 8,587,735 B2
(45) Date of Patent: Nov. 19, 2013

(54) STEREOSCOPIC GLASSES

(71) Applicant: Sony Corporation, Tokyo (JP)

(72) Inventor: Hideki Arai, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 13/886,601

(22) Filed: May 3, 2013

(65) Prior Publication Data

US 2013/0242388 A1   Sep. 19, 2013

Related U.S. Application Data

(63) Continuation of application No. 12/655,912, filed on Jan. 8, 2010, now Pat. No. 8,462,279.

(30) Foreign Application Priority Data

Jan. 9, 2009   (JP) ................ P2009-003691

(51) Int. Cl.
*H04N 13/04*   (2006.01)

(52) U.S. Cl.
USPC .................. 349/13; 351/41; 351/57

(58) Field of Classification Search
USPC .................. 349/13; 351/41, 47, 57
See application file for complete search history.

(56) References Cited

U.S. PATENT DOCUMENTS

| | | |
|---|---|---|
| 5,123,724 A | 6/1992 | Salk |
| 6,266,106 B1 | 7/2001 | Murata et al. |
| 2009/0073558 A1* | 3/2009 | Jacobs et al. ............ 359/464 |

FOREIGN PATENT DOCUMENTS

| | | |
|---|---|---|
| CN | 100374906 | 8/2003 |
| CN | 1837899 A | 9/2006 |
| JP | 43023431 Y1 | 10/1968 |
| JP | 56080015 A | 7/1981 |
| JP | 56111828 A | 9/1981 |
| JP | 59079294 U | 5/1984 |
| JP | 60094217 U | 6/1985 |
| JP | 60191019 U | 12/1985 |
| JP | 05150195 A | 6/1993 |
| JP | 3031881 | 9/1996 |
| JP | 3032862 U | 1/1997 |
| JP | 3052314 | 7/1998 |
| JP | 11-075223 A | 3/1999 |
| JP | 11-095186 A | 4/1999 |
| JP | 11-098537 A | 4/1999 |
| JP | 3117580 | 12/2005 |
| WO | 03/065107 A1 | 8/2003 |

OTHER PUBLICATIONS

Office Action from China 201010002903.5, dated Aug. 24, 2011.
Office Action from Japanese Application No. 2009-003691, dated Nov. 6, 2012.

* cited by examiner

*Primary Examiner* — Sath V Perungavoor
*Assistant Examiner* — Jeffery Williams
(74) *Attorney, Agent, or Firm* — Lerner, David, Littenberg, Krumholz & Mentlik, LLP

(57) ABSTRACT

A pair of stereoscopic glasses includes a pair of left and right stereoscopic rims connected to each other and respectively holding stereoscopic optical components used when observing a stereoscopic image, and a stereoscopic frame that includes stereoscopic temples extending rearward from the stereoscopic rims. The stereoscopic frame is provided with an engagement section that is brought into engagement with a rim or a bridge of a frame of glasses already worn by a user in a state where the stereoscopic optical components are positioned in front of lenses of the glasses so that the stereoscopic optical components are positionally maintained in front of the lenses of the glasses.

10 Claims, 26 Drawing Sheets

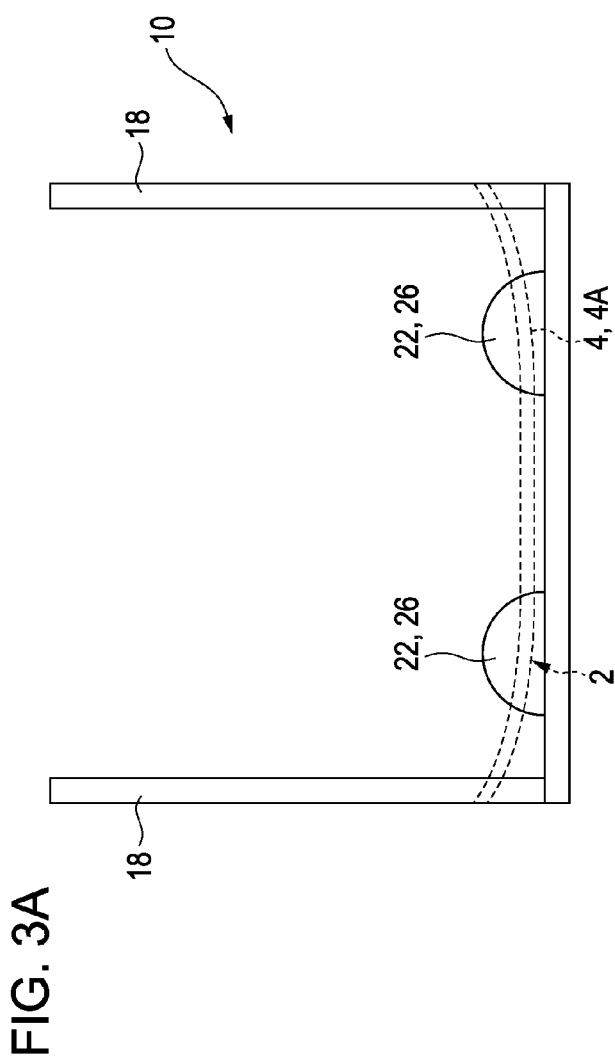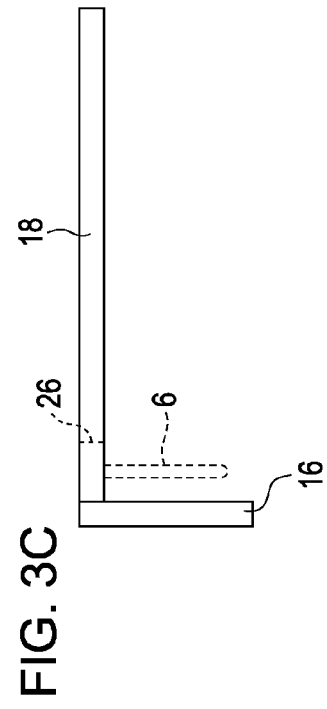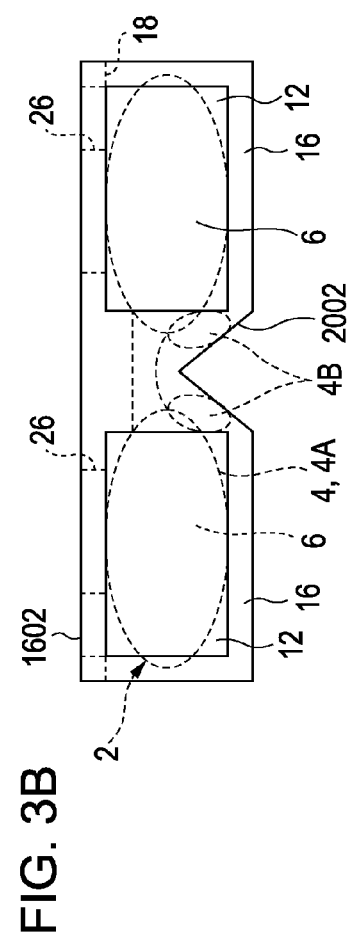

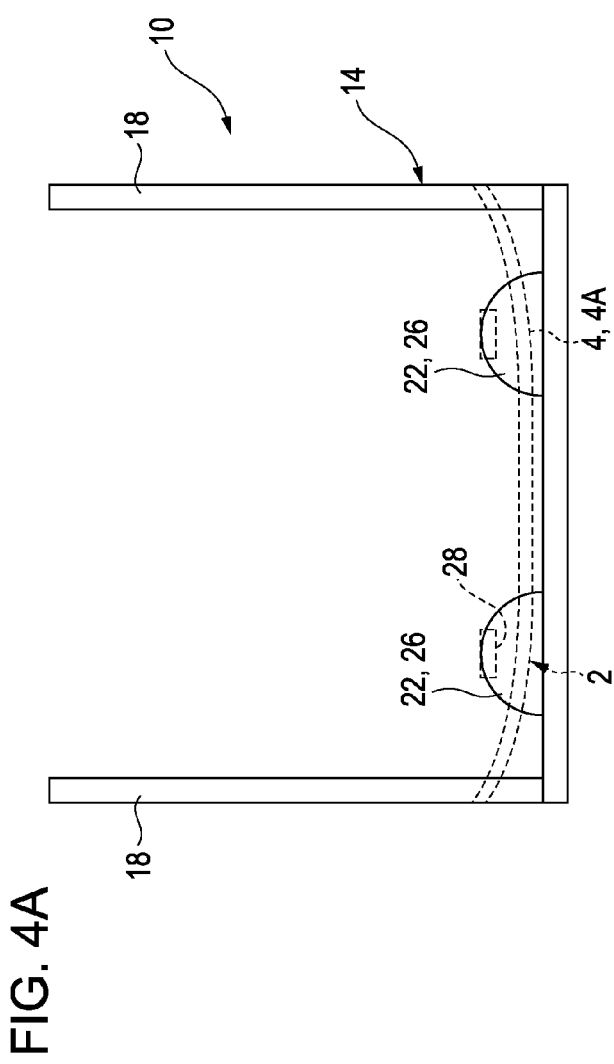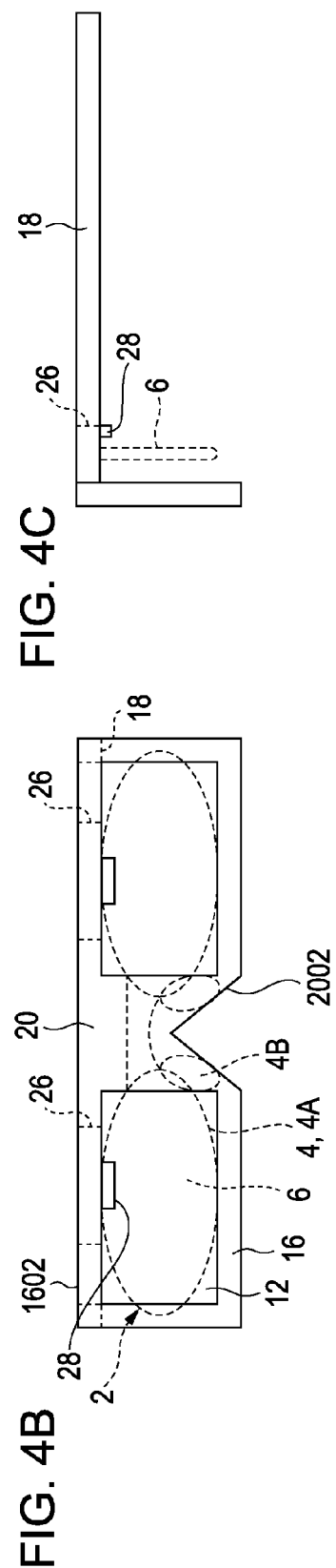

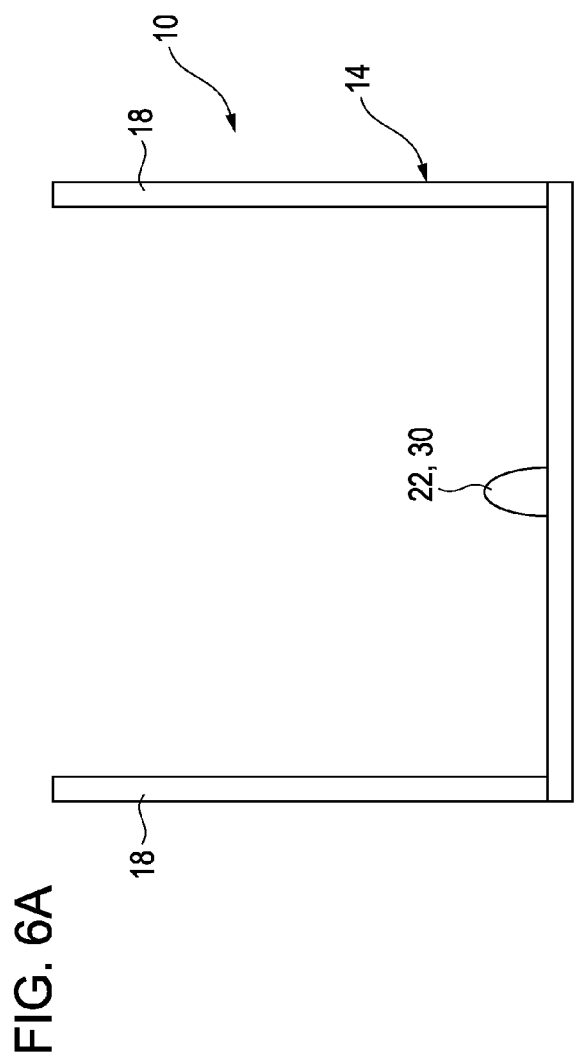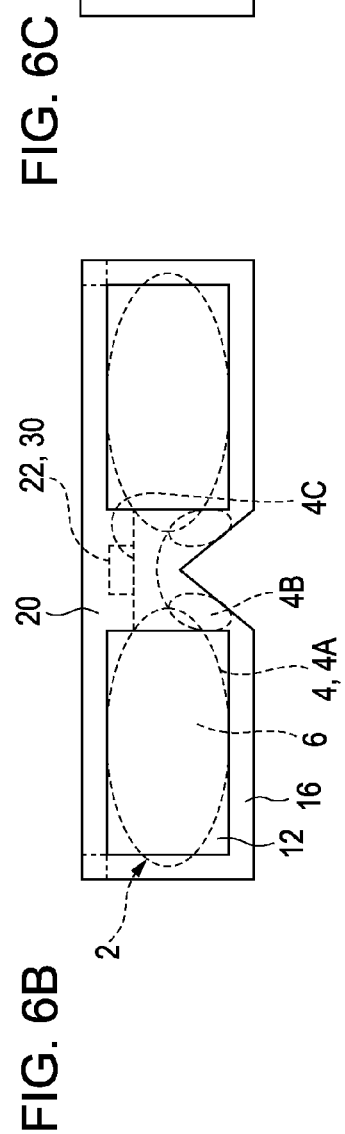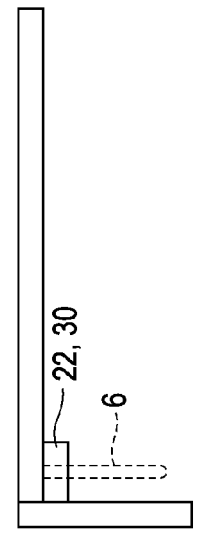

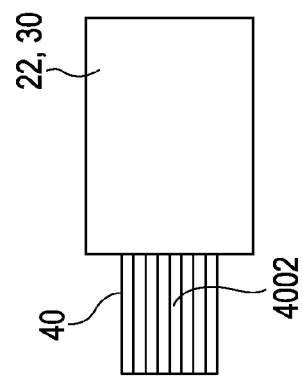
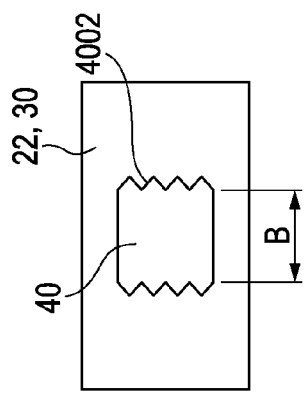
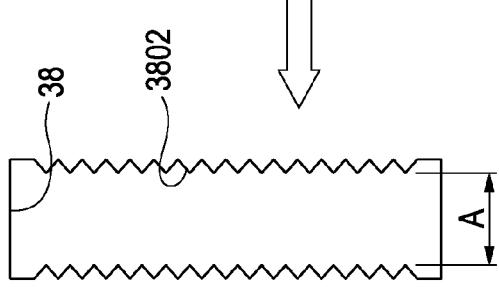
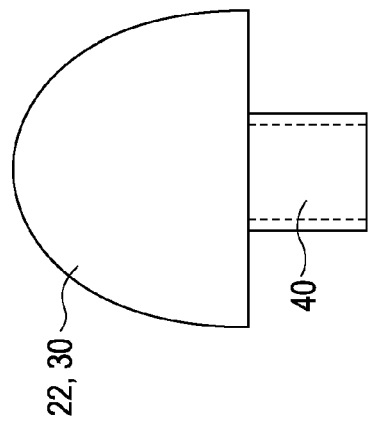

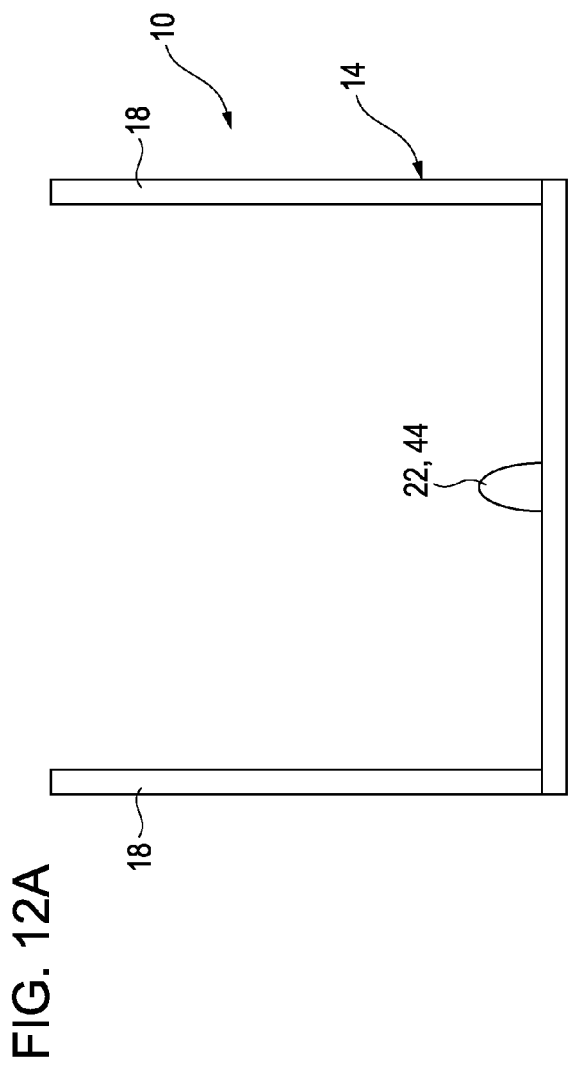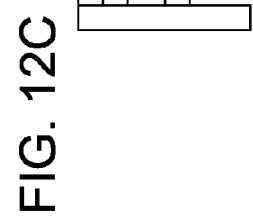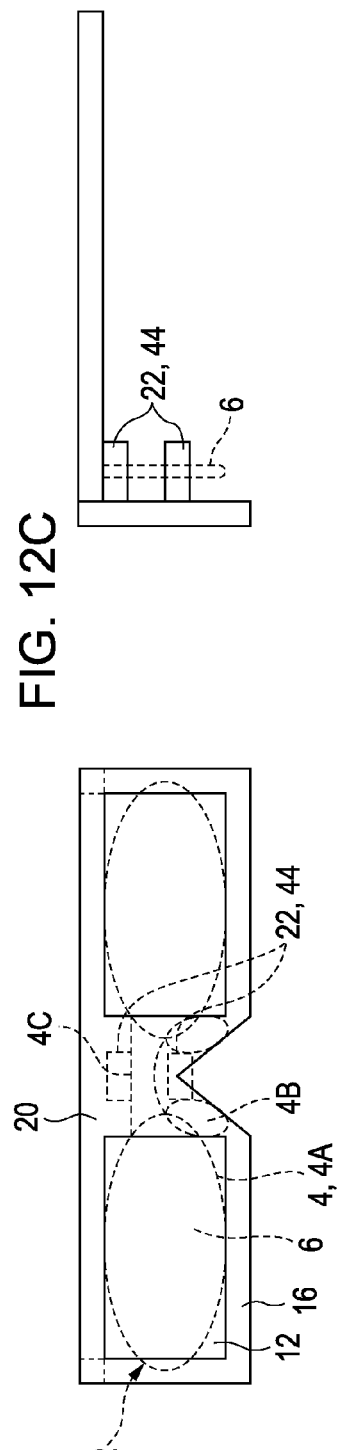

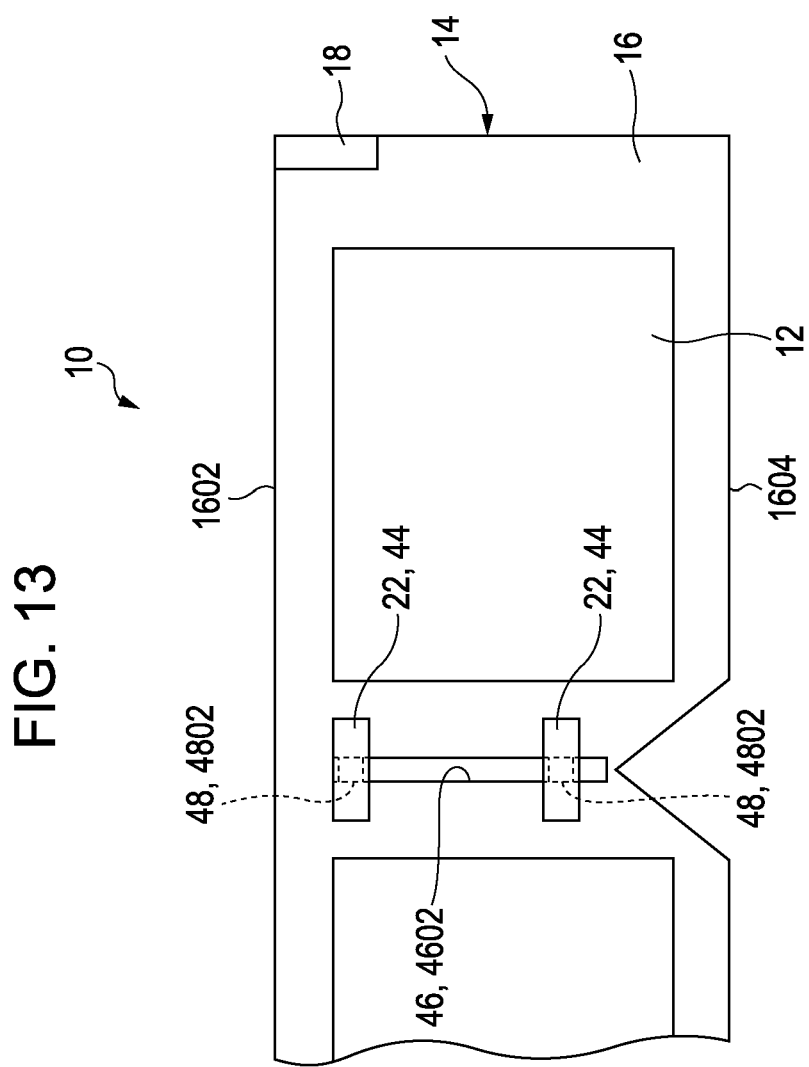

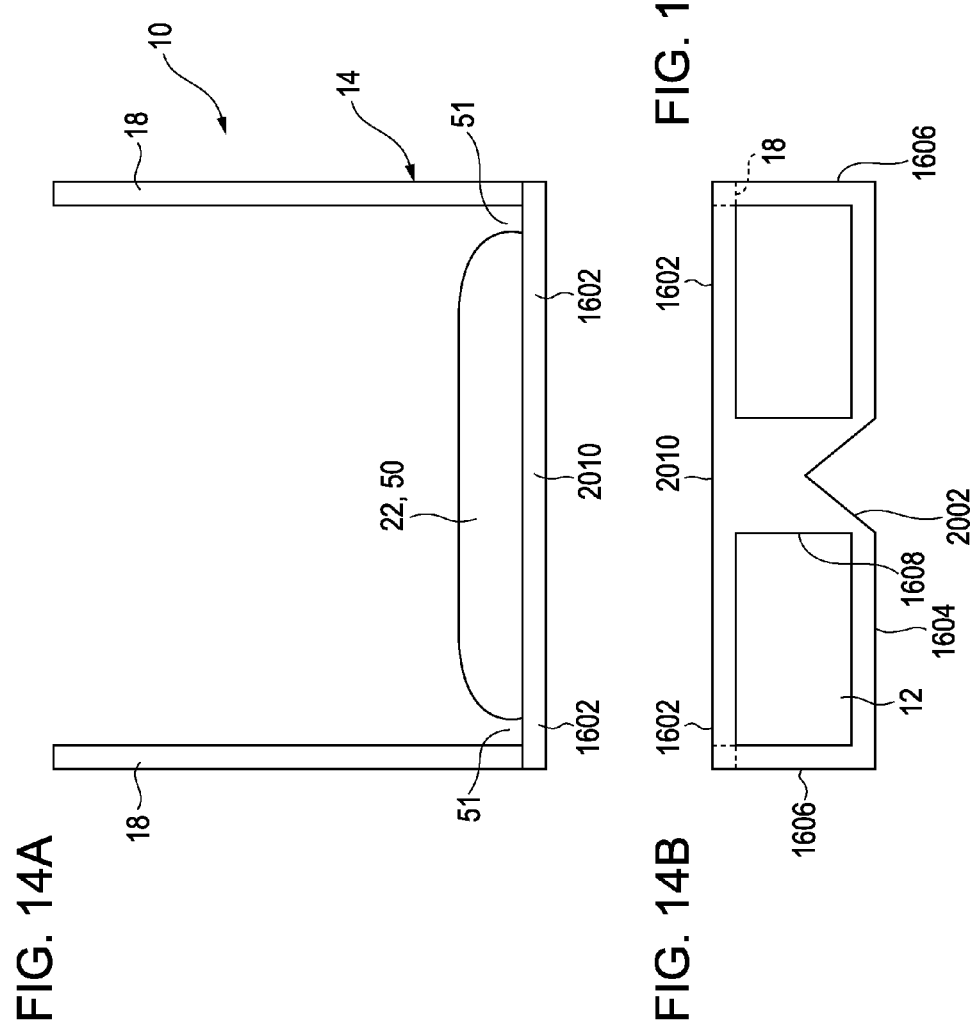

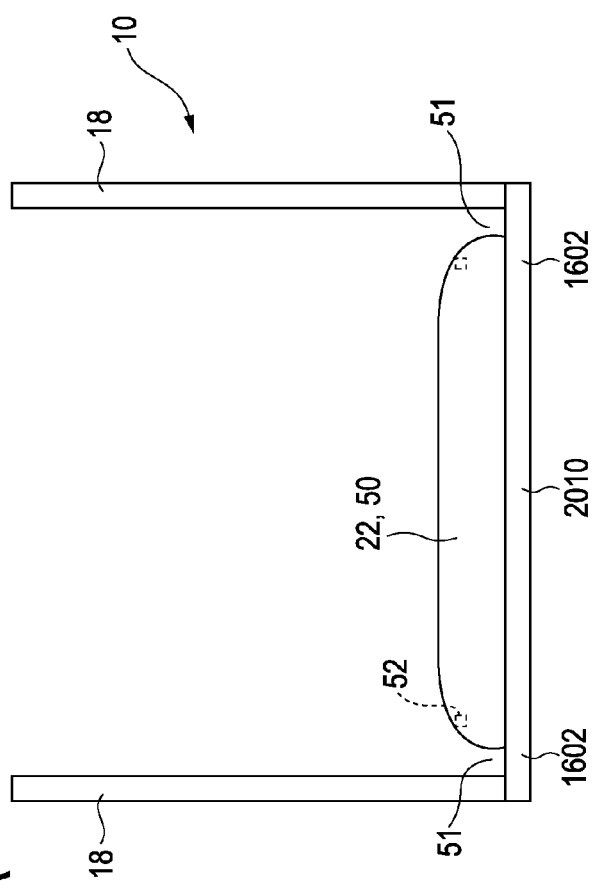
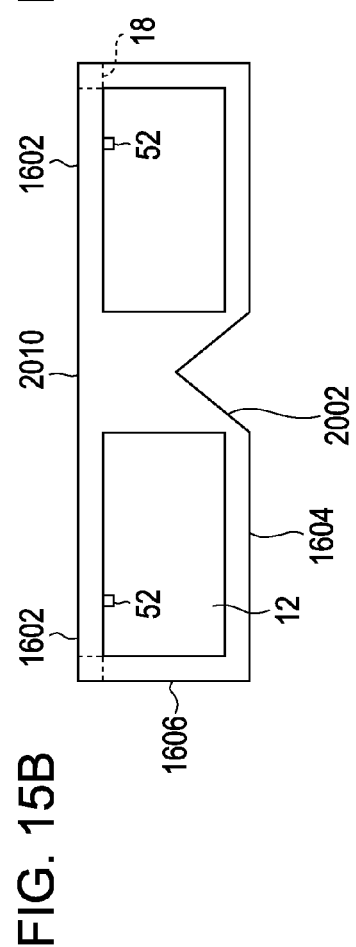
FIG. 15A
FIG. 15B
FIG. 15C

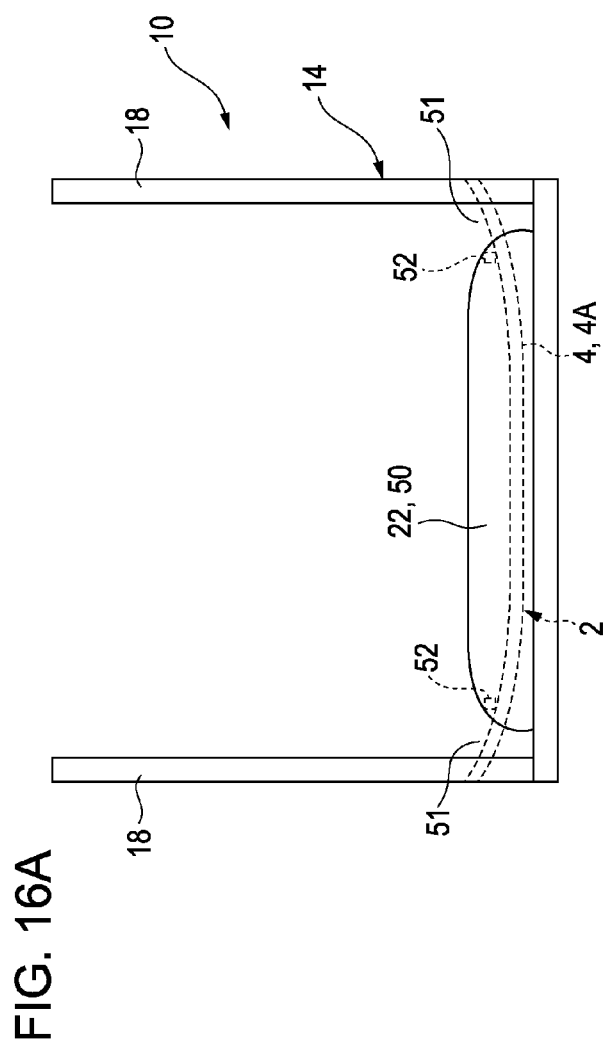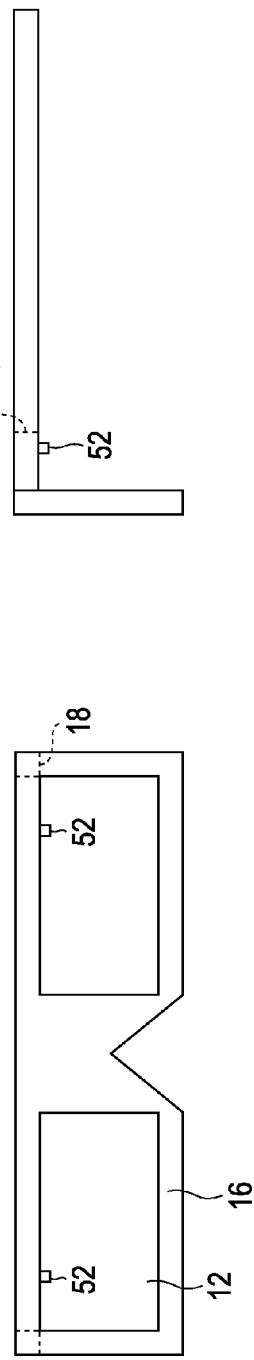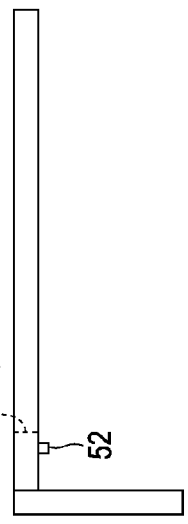

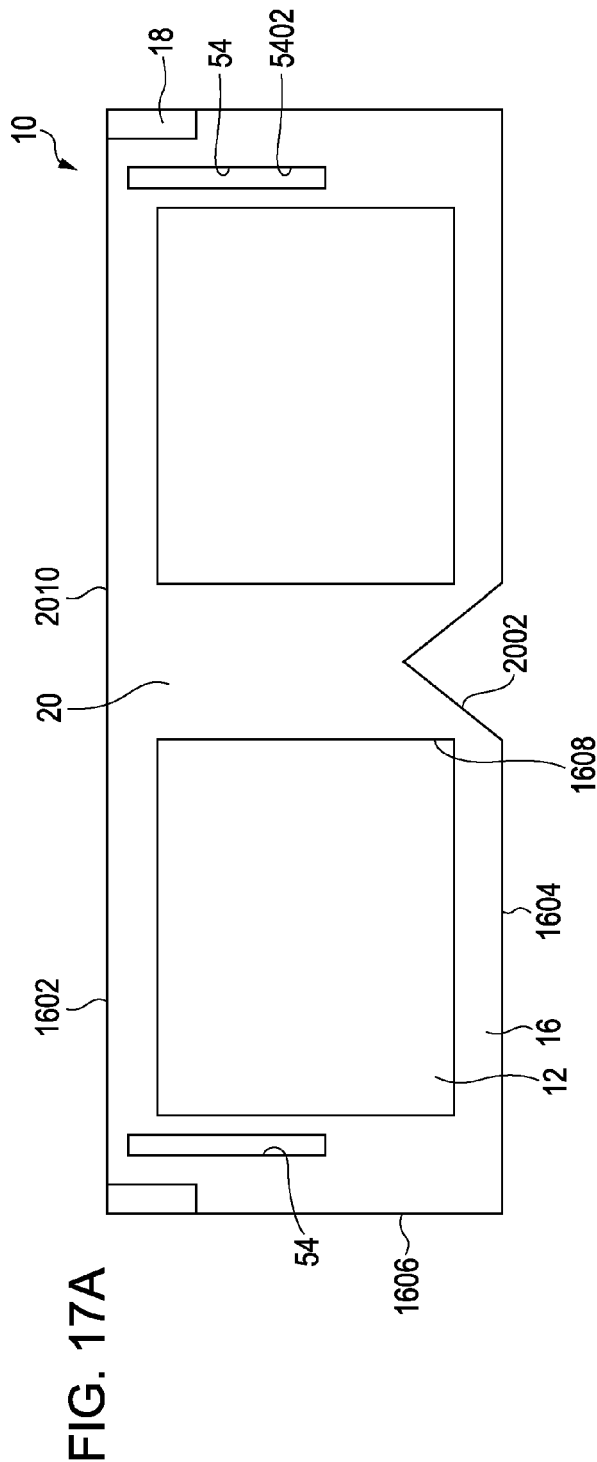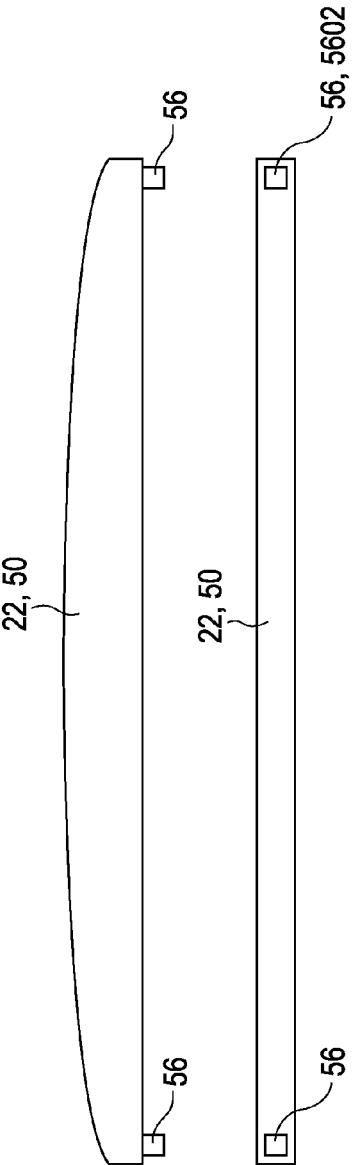
FIG. 17A
FIG. 17B
FIG. 17C

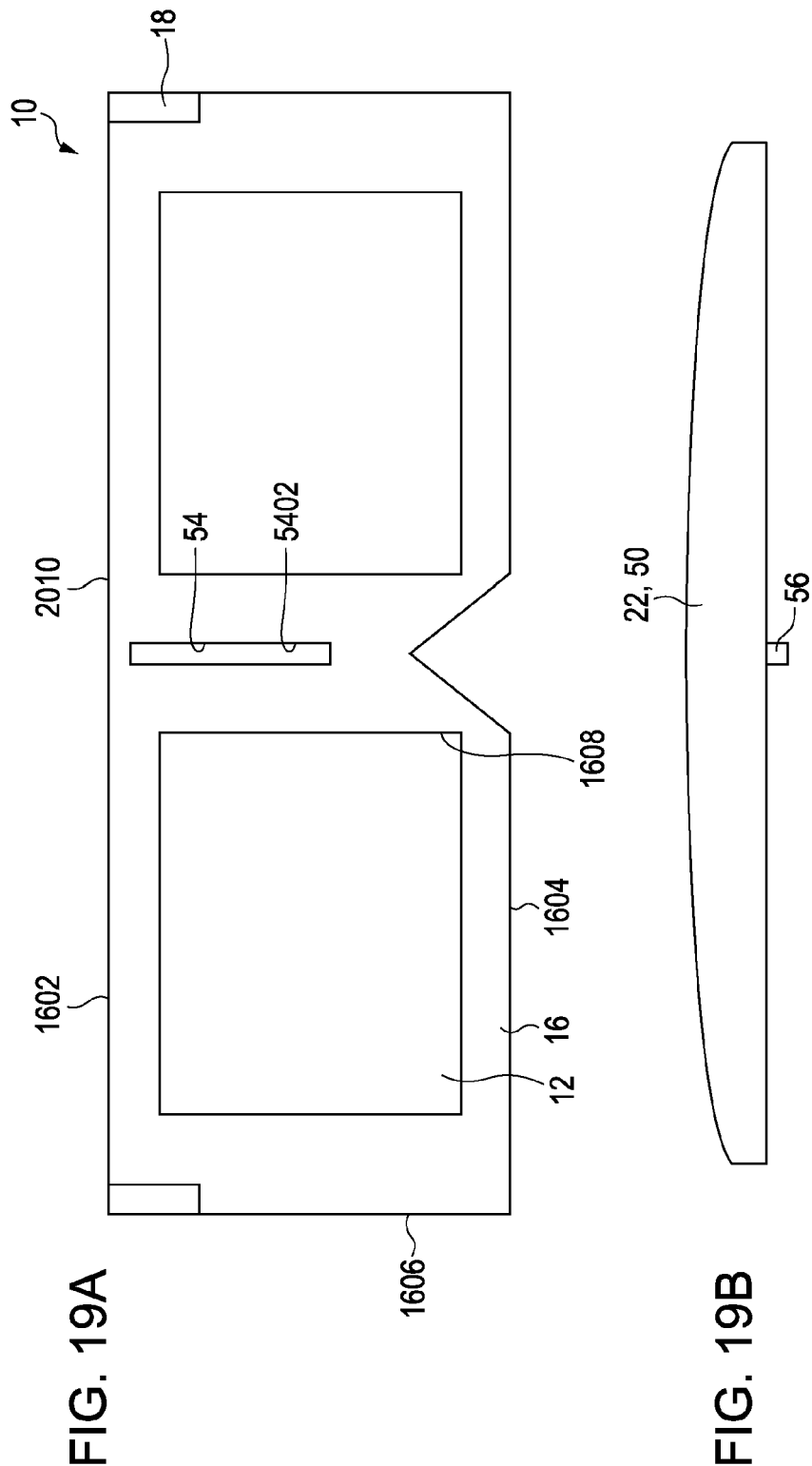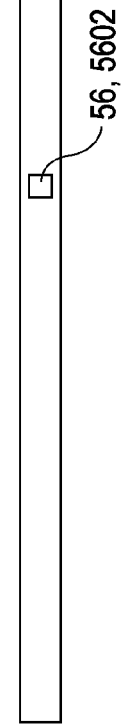

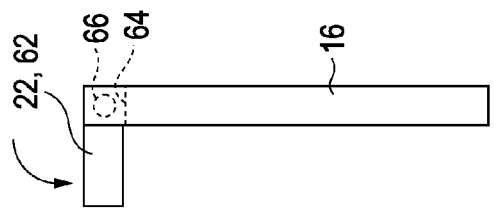
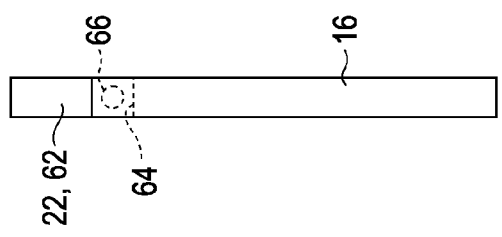
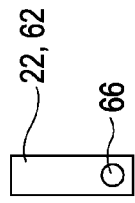
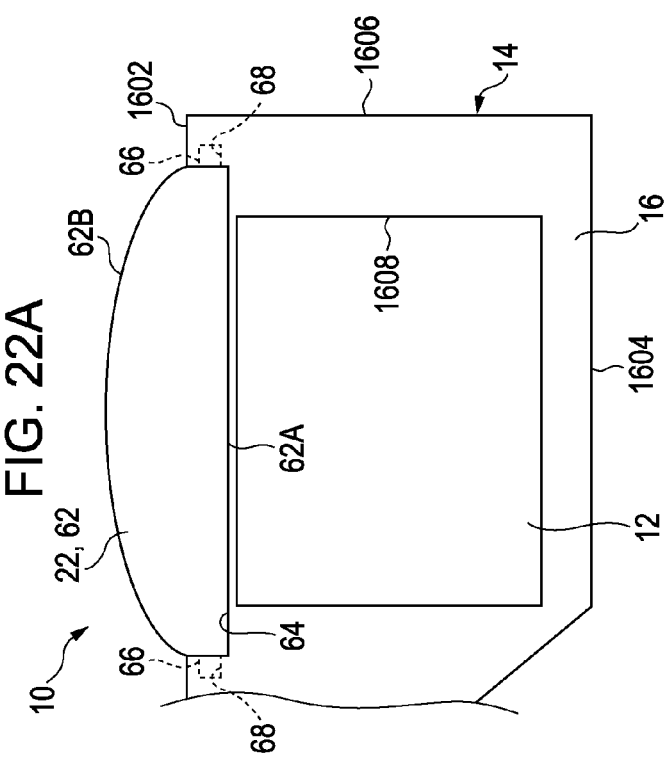
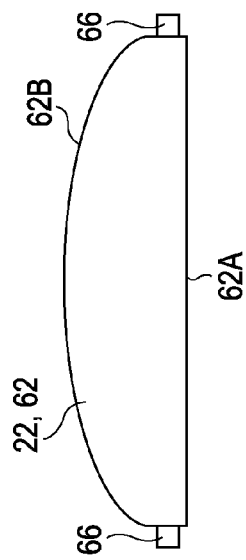

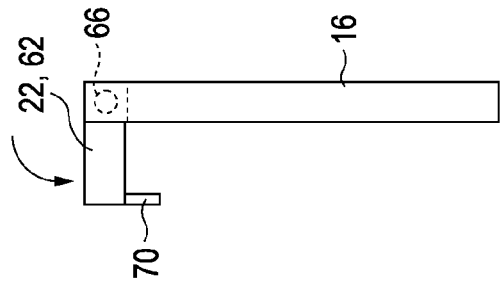
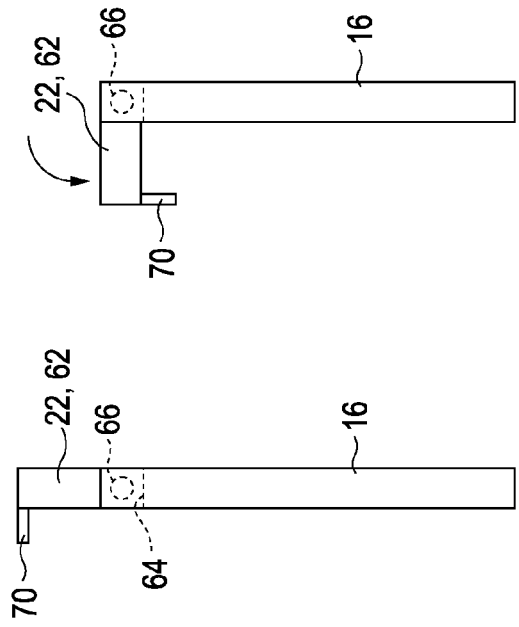
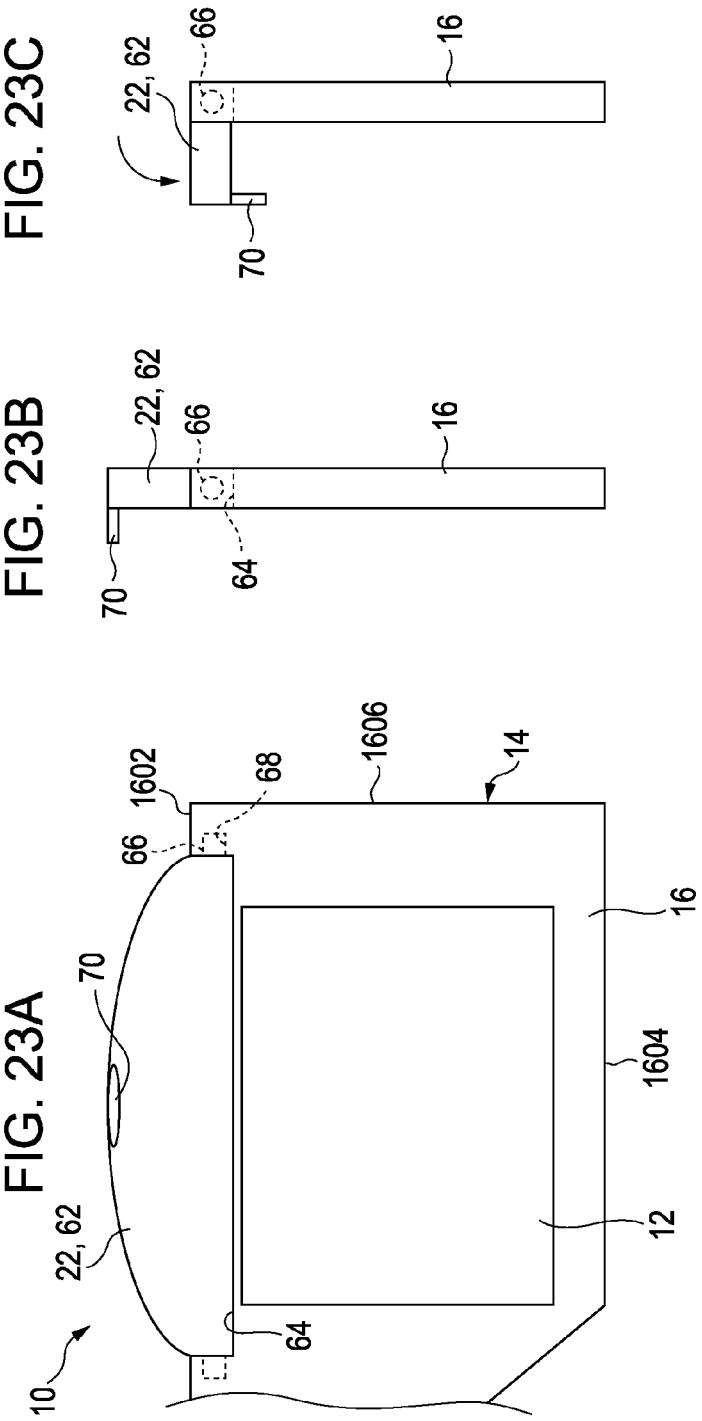
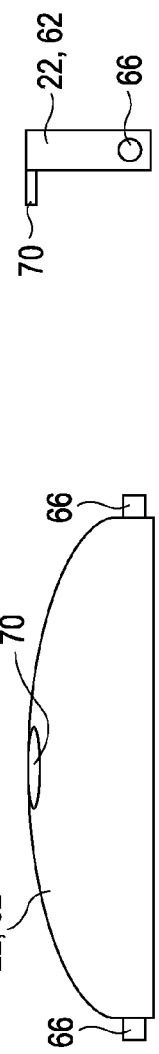

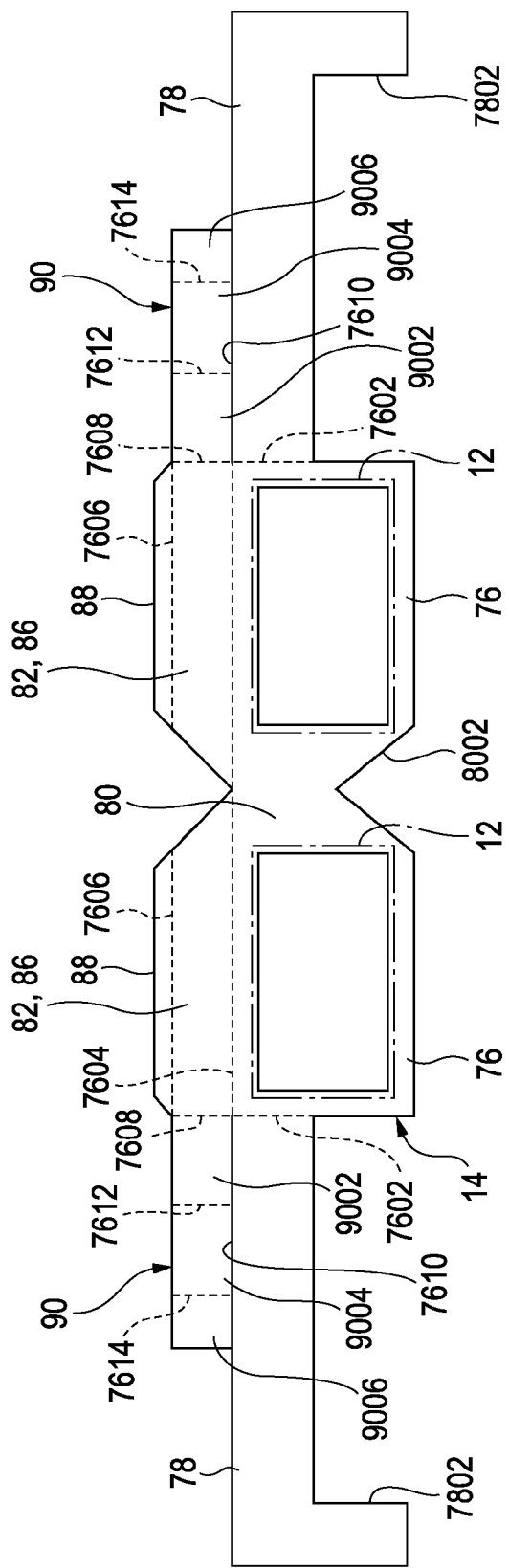

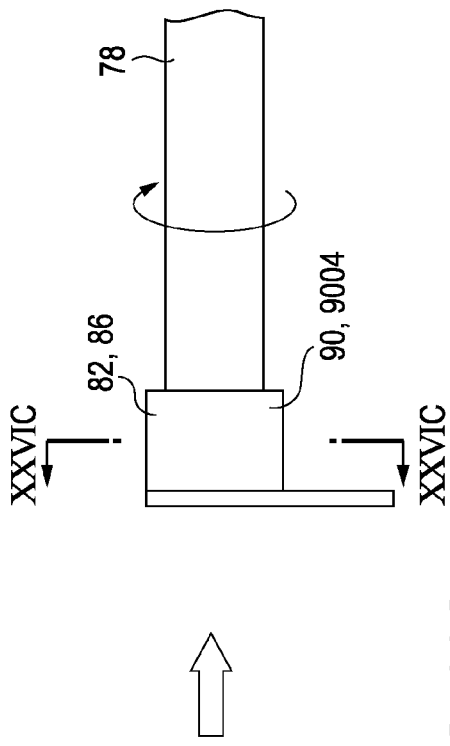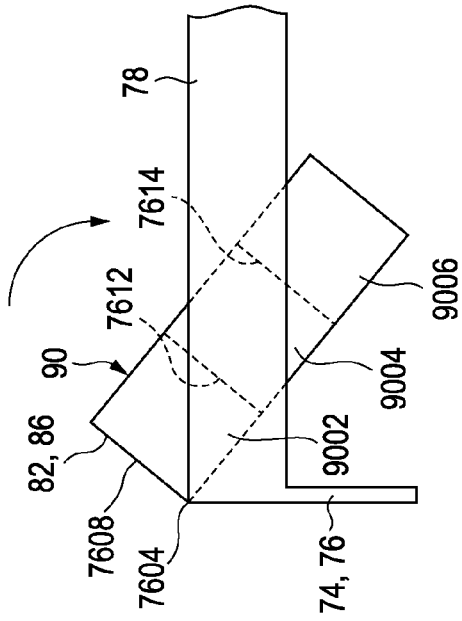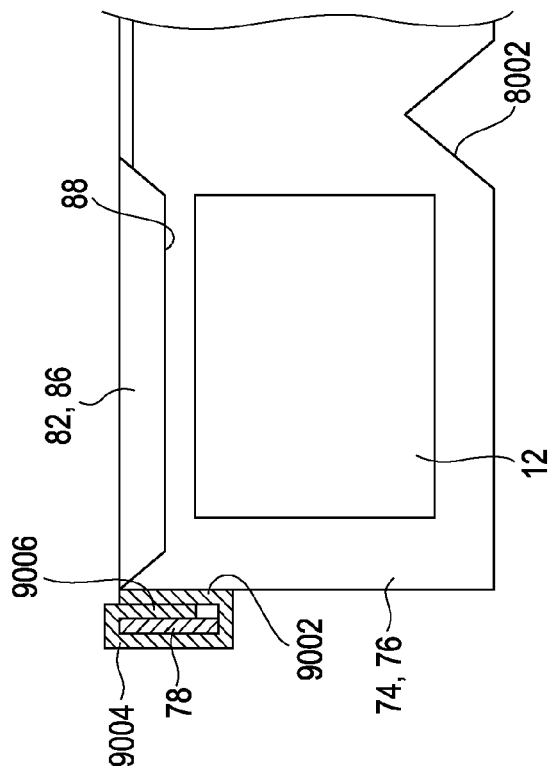

STEREOSCOPIC GLASSES

CROSS-REFERENCE TO RELATED APPLICATIONS

The present application is a continuation of U.S. patent Ser. No. 12/655,912 filed on Jan. 8, 2010, which claims priority from Japanese Patent Application No. JP 2009-003691 filed in the Japanese Patent Office on Jan. 9, 2009, all of which are incorporated herein by reference.

BACKGROUND OF THE INVENTION

1. Field of the Invention

The present invention relates to stereoscopic glasses.

2. Description of the Related Art

In the related art, three-dimensional image display systems use a stereoscopic image projector to project an image for the left eye and an image for the right eye onto a screen so that a user wearing a pair of stereoscopic glasses can observe a stereoscopic image on the screen.

Examples of such stereoscopic glasses are provided by Japanese Unexamined Patent Application Publications Nos. 11-75223, 11-95186, and 11-98537. Specifically, in these examples, a pair of stereoscopic glasses includes a pair of left and right stereoscopic rims connected to each other and respectively holding stereoscopic optical components used when observing a stereoscopic image and a stereoscopic frame that includes stereoscopic temples connected to the stereoscopic rims.

The stereoscopic optical components are used for performing stereoscopic operation by independently guiding an image for the left eye to the left eye and an image for the right eye to the right eye.

SUMMARY OF THE INVENTION

When a user already wearing vision-correction glasses desires to wear stereoscopic glasses, the user would wear the stereoscopic glasses by putting on the stereoscopic frame over the frame of the already-worn glasses.

Therefore, not only is it difficult to put on the stereoscopic glasses, but it is also difficult to stably set the stereoscopic glasses in position. Thus, the stereoscopic optical components of the stereoscopic glasses tend to shift from a position in front of the lenses of the already-worn glasses, resulting in a difficulty in performing stable stereoscopic operation of three-dimensional images.

It is therefore desirable to provide a pair of stereoscopic glasses that can advantageously allow for stable stereoscopic operation and can be easily worn even over already-worn glasses.

According to an embodiment of the present invention, there is provided a pair of stereoscopic glasses including a pair of left and right stereoscopic rims connected to each other and respectively holding stereoscopic optical components used when observing a stereoscopic image, and a stereoscopic frame that includes stereoscopic temples extending rearward from the stereoscopic rims. The stereoscopic frame is provided with an engagement section that is brought into engagement with a rim or a bridge of a frame of glasses already worn by a user in a state where the stereoscopic optical components are positioned in front of lenses of the glasses so that the stereoscopic optical components are positionally maintained in front of the lenses of the glasses.

The pair of stereoscopic glasses according to the embodiment of the present invention is worn by a user by means of the stereoscopic temples.

The engagement section engages with the rim or the bridge of the frame of the glasses already worn by the user so as to positionally maintain the stereoscopic optical components in front of the lenses of the glasses.

BRIEF DESCRIPTION OF THE DRAWINGS

FIGS. 3A, 3B, and 3C are a plan view, a front view, and a side view, respectively, of the stereoscopic glasses 10 according to the first embodiment in use;

FIGS. 4A, 4B, and 4C are a plan view, a front view, and a side view, respectively, of stereoscopic glasses 10 according to a second embodiment of the present invention;

FIGS. 6A, 6B, and 6C are a plan view, a front view, and a side view, respectively, of stereoscopic glasses 10 according to a third embodiment of the present invention;

FIG. 10A is a plan view of an attachment slit 38 according to the fifth embodiment, and FIGS. 10B, 10C, and 10D are a plan view, a front view, and a side view, respectively, of the stopper segment 30 according to the fifth embodiment;

FIGS. 12A, 12B, and 12C are a plan view, a front view, and a side view, respectively, of stereoscopic glasses 10 according to a seventh embodiment of the present invention in use;

FIG. 13 is a rear view of stereoscopic glasses 10 according to an eighth embodiment of the present invention;

FIGS. 14A, 14B, and 14C are a plan view, a front view, and a side view, respectively, of stereoscopic glasses 10 according to a ninth embodiment of the present invention;

FIGS. 15A, 15B, and 15C are a plan view, a front view, and a side view, respectively, of stereoscopic glasses 10 according to a tenth embodiment of the present invention;

FIGS. 16A, 16B, and 16C are a plan view, a front view, and a side view, respectively, of the stereoscopic glasses 10 according to the tenth embodiment in use;

FIG. 17A is a rear view of stereoscopic glasses 10 according to an eleventh embodiment of the present invention, and FIGS. 17B and 17C are a plan view and a front view, respectively, of a stopper segment 50 according to the eleventh embodiment;

FIG. 19A is a rear view of stereoscopic glasses 10 according to a twelfth embodiment of the present invention, and FIGS. 19B and 19C are a plan view and a front view, respectively, of a stopper segment 50 according to the twelfth embodiment;

FIG. 22A is a rear view of stereoscopic glasses 10 according to a fourteenth embodiment of the present invention, FIG. 22B is a side view showing a stopper segment 62 of the stereoscopic glasses 10 in a non-securing position, FIG. 22C is a side view showing the stopper segment 62 of the stereoscopic glasses 10 in a securing position, and FIGS. 22D and 22E are a plan view and a side view, respectively, of the stopper segment 62;

FIG. 23A is a rear view of stereoscopic glasses 10 according to a fifteenth embodiment of the present invention, FIG. 23B is a side view showing a stopper segment 62 of the stereoscopic glasses 10 in a non-securing position, FIG. 23C is a side view showing the stopper segment 62 of the stereoscopic glasses 10 in a securing position, and FIGS. 23D and 23E are a plan view and a side view, respectively, of the stopper segment 62;

FIG. 24 is a development view of stereoscopic glasses 10 according to a sixteenth embodiment of the present invention;

FIGS. 26A and 26B are an assembly view and a side view, respectively, of the stereoscopic glasses 10 according to the sixteenth embodiment, and FIG. 26C is a cross-sectional view taken along line XXVIC-XXVIC in FIG. 26B.

DESCRIPTION OF THE PREFERRED EMBODIMENTS

First Embodiment

A first embodiment of the present invention will now be described with reference to FIGS. 1A to 3C.

Figure 1A:
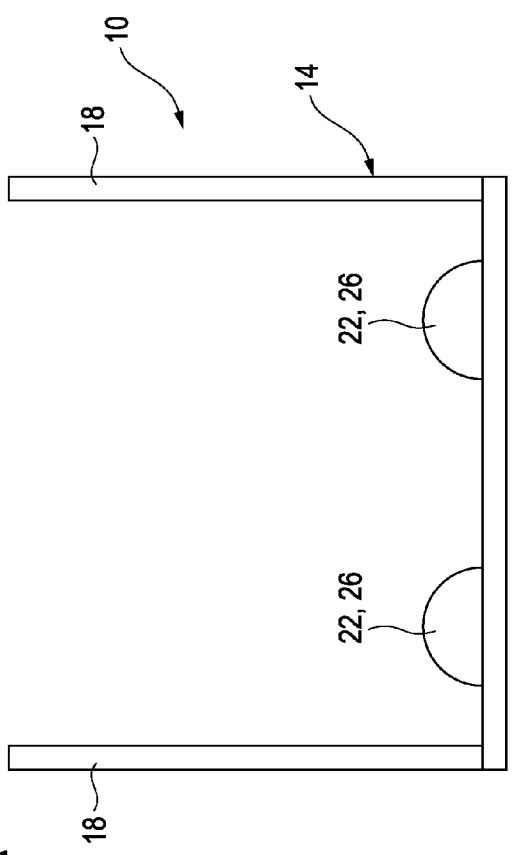
FIGS. 1A, 1B, and 1C are a plan view, a front view, and a side view, respectively, of stereoscopic glasses 10 according to a first embodiment of the present invention.
Figure 1B:
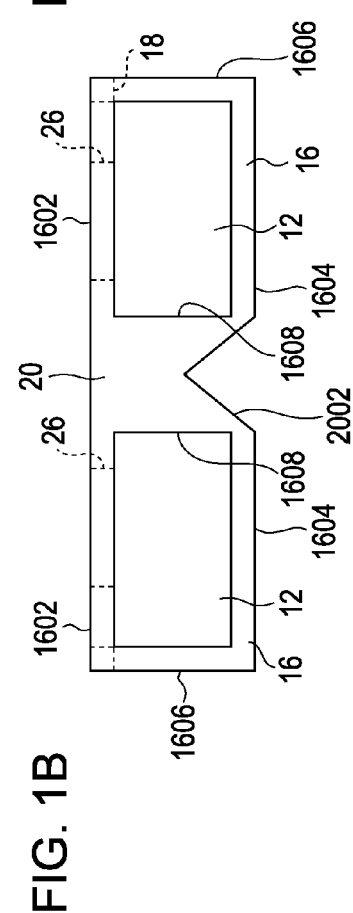
Figure 1C:
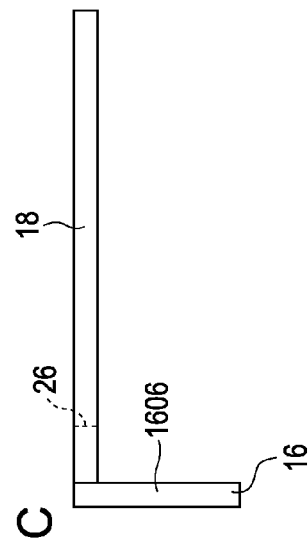

Referring to FIGS. 1A, 1B, and 1C, a pair of stereoscopic glasses 10 includes a pair of left and right stereoscopic optical components 12 and a frame 14 that holds these stereoscopic optical components 12.

The stereoscopic optical components 12 are thin rectangular plates of the same shape and size.

The stereoscopic optical components 12 are to be used when observing a stereoscopic image.

Specifically, the stereoscopic optical components 12 are used for performing stereoscopic operation by independently guiding an image for the left eye to the left eye and an image for the right eye to the right eye.

Examples of stereoscopic optical components 12 include two liquid-crystal shutters that can be driven between transparent and nontransparent modes, two polarizing filters (i.e., polarizing plates) with different polarization directions, and two wavelength-selective filters with different transparent characteristics.

As an alternative to the aforementioned liquid-crystal shutters or filters, various optical components of related art may be used as the stereoscopic optical components 12.

The frame 14 includes a pair of left and right stereoscopic rims 16, a pair of left and right stereoscopic temples 18, a stereoscopic bridge 20, and an engagement section 22.

The stereoscopic rims 16, the stereoscopic temples 18, the stereoscopic bridge 20, and the engagement section 22 are formed as a single unit with synthetic resin.

The synthetic resin used here may be selected from various kinds of synthetic resin of related art, such as ABS resin or nylon.

The two stereoscopic rims 16 are connected to each other and respectively hold the two stereoscopic optical components 12.

The stereoscopic rims 16 each have a rectangular frame-like shape constituted by an upper rim segment 1602, a lower rim segment 1604, an outer rim segment 1606, and an inner rim segment 1608.

The upper rim segment 1602 extends horizontally along an upper edge of the corresponding stereoscopic optical component 12.

The lower rim segment 1604 extends horizontally along a lower edge of the corresponding stereoscopic optical component 12.

The outer rim segment 1606 extends vertically along an outer edge of the corresponding stereoscopic optical component 12.

The inner rim segment 1608 extends vertically along an inner edge of the corresponding stereoscopic optical component 12.

The stereoscopic bridge 20 is provided between the two stereoscopic rims 16 and is configured to connect the two stereoscopic rims 16.

In this embodiment, the stereoscopic bridge 20 extends horizontally at the same height as the stereoscopic rims 16 and connects the inner rim segments 1608 of the two stereoscopic rims 16.

A lower section of the stereoscopic bridge 20 is provided with a notch 2002 that opens downward.

When a user already wearing glasses puts on the stereoscopic glasses 10, the user's nose is prevented from touching the stereoscopic bridge 20 by this notch 2002.

On the other hand, if the stereoscopic glasses 10 are to be worn by a user not wearing glasses, the notch 2002 allows the stereoscopic bridge 20 to be hooked onto the user's nose so that the stereoscopic glasses 10 can be worn by the user.

The two stereoscopic temples 18 each have a long slender body with one longitudinal end connected to the outer end of the upper rim segment 1602 and the upper end of the outer rim segment 1606 of the corresponding stereoscopic rim 16 and extend rearward from the stereoscopic rim 16.

The rear sections of the two stereoscopic temples 18 are hooked onto the user's ears or the two stereoscopic temples 18 clamp the temporal sections of the user's head so that the stereoscopic glasses 10 can be worn by the user.

In detail, when the stereoscopic glasses 10 are to be worn by a user already wearing glasses, the rear sections of the stereoscopic temples 18 are hooked onto the user's ears from the outer side of the temples of the already-worn glasses or at a position above the temples of the already-worn glasses.

Alternatively, when the stereoscopic glasses 10 are to be worn by a user already wearing glasses, the rear sections of the stereoscopic temples 18 are set to clamp the temporal sections of the user's head from the outer side of the temples of the already-worn glasses or at a position above the temples of the already-worn glasses.

When the stereoscopic glasses 10 are to be worn by a user not wearing glasses, the rear sections of the stereoscopic temples 18 are hooked onto the user's ears or set to clamp the temporal sections of the user's head. In this case, the notch 2002 is hooked onto the user's nose such that the notch 2002 serves as a nosepiece, whereby the stereoscopic glasses 10 can be stably worn by the user.

The stereoscopic temples 18 and the stereoscopic rims 16 may be formed as a single unit as mentioned above, or the stereoscopic temples 18 and the stereoscopic rims 16 may be hinged to each other such that the stereoscopic temples 18 are foldable toward the stereoscopic rims 16.

Referring to FIGS. 3A, 3B, and 3C, the frame 14 is provided with the engagement section 22.

In a state where the stereoscopic optical components 12 are positioned in front of lenses 6 of glasses 2 already worn by a user, the engagement section 22 is brought into engagement with rims 4A of a frame 4 of the glasses 2 so as to positionally maintain the stereoscopic optical components 12 in front of the lenses 6 of the glasses 2.

In FIG. 3B, reference numeral 4B denotes a nosepiece (pad) of the glasses 2.

In this embodiment, the engagement section 22 includes two stopper segments 26 that protrude rearward respectively from the upper rim segments 1602 of the two stereoscopic rims 16 and that can be placed on the rims 4A of the frame 4 of the glasses 2 from above.

Figure 2A:
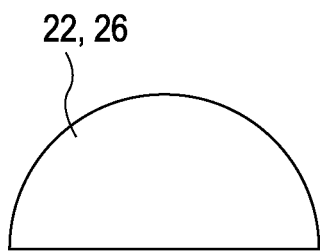
FIGS. 2A, 2B, and 2C are a plan view, a front view, and a side view, respectively, of an engagement section 22 according to the first embodiment.
Figure 2B:
Figure 2C:
Figure 5A:
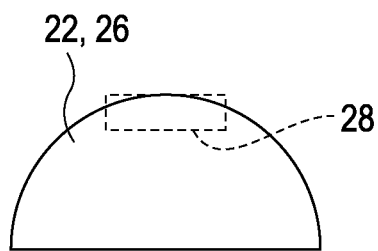
FIGS. 5A, 5B, and 5C are a plan view, a front view, and a side view, respectively, of an engagement section 22 according to the second embodiment.
Figure 5B:
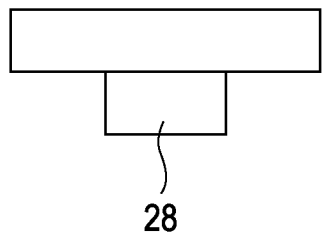
Figure 5C:
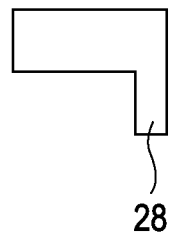

Referring to FIGS. 2A, 2B, and 2C, the stopper segments 26 both have a semicircular shape of the same size. The midsection of each stopper segment 26 in the left-right width direction is the most rearward protruding section.

The stopper segments 26 protrude rearward by a length that prevents the stereoscopic glasses 10 from touching the user's eyelids when the stereoscopic glasses 10 are worn by a user not wearing glasses. In other words, the stopper segments 26 are made so that a user not wearing glasses is able to wear the stereoscopic glasses 10 like common glasses without any trouble.

In the first embodiment, when the stereoscopic glasses 10 are to be worn by a user already wearing glasses, the rear sections of the stereoscopic temples 18 are hooked onto the user's ears from the outer side of the temples of the already-worn glasses or at a position above the temples of the already-worn glasses.

Alternatively, when the stereoscopic glasses 10 are to be worn by a user already wearing glasses, the rear sections of the stereoscopic temples 18 are set to clamp the temporal sections of the user's head from the outer side of the temples of the already-worn glasses or at a position above the temples of the already-worn glasses.

By placing the stopper segments 26 of the engagement section 22 included in the stereoscopic frame 14 onto the rims 4A of the frame 4 of the glasses 2 already worn by the user, the stereoscopic optical components 12 can be positionally maintained in front of the lenses 6 of the glasses 2.

Consequently, with such simple operation of placing the stopper segments 26 on the rims 4A, the stereoscopic frame 14 can be worn over the frame 4 of the glasses 2 already worn by the user, thereby advantageously allowing for easier wearability.

In addition, the stable positioning of the stereoscopic optical components 12 in front of the lenses 6 of the already-worn glasses 2 advantageously allows for reliable stereoscopic operation of three-dimensional images.

Second Embodiment

A second embodiment of the present invention will now be described with reference to FIGS. 4A to 5C. The sections and components in this embodiment that are similar to those in the first embodiment are given the same reference numerals, and therefore, the descriptions of those sections and components will not be repeated.

The second embodiment is a modification of the first embodiment and differs from the first embodiment in that the stopper segments 26 are provided with projections 28, as shown in FIGS. 4A, 4B, and 4C.

The projections 28 are each provided at an end of the corresponding stopper segment 26 most distant from the upper rim segment 1602 of the corresponding stereoscopic rim 16, that is, a rear end of the stopper segment 26.

The projections 28 can be secured to the rims 4A of the frame 4 of the glasses 2 or to the lenses 6 held by these rims 4A. By securing the projections 28 to the rims 4A or the lenses 6, forward movement of the stereoscopic optical components 12 can be prevented.

When the stereoscopic glasses 10 are worn over the glasses 2, forward movement of the stereoscopic optical components 12 is reliably prevented even when the user tilts his/her head downward since the projections 28 are secured to the rims 4A or the lenses 6 of the glasses 2.

In consequence, the second embodiment is further advantageous in terms of stable positioning of the stereoscopic optical components 12 in front of the lenses 6 of the already-worn glasses 2, thereby advantageously allowing for reliable stereoscopic operation of three-dimensional images.

Third Embodiment

A third embodiment of the present invention will now be described with reference to FIGS. 6A to 6C.

As shown in FIGS. 6A, 6B, and 6C, the third embodiment differs from the first embodiment in that the engagement section 22 is included in the stereoscopic bridge 20.

The engagement section 22 includes a stopper segment 30 that protrudes rearward from the stereoscopic bridge 20 and that can be placed on a bridge 4C of the frame 4 of the glasses 2 from above.

The stopper segment 30 and the stereoscopic bridge 20 are formed as a single unit.

As shown in FIGS. 6A, 6B, and 6C, the stopper segment 30 has a convex shape that protrudes rearward, and the midsection thereof in the left-right width direction is the most rearward protruding section.

The stopper segment 30 protrudes rearward by a length that prevents the stereoscopic glasses 10 from touching the user's eyelids when the stereoscopic glasses 10 are worn by a user not wearing glasses. In other words, the stopper segment 30 is made so that a user not wearing glasses is able to wear the stereoscopic glasses 10 like common glasses without any trouble.

In the third embodiment, when the stereoscopic glasses 10 are to be worn by a user already wearing glasses, the rear sections of the stereoscopic temples 18 are hooked onto the user's ears from the outer side of the temples of the already-worn glasses or at a position above the temples of the already-worn glasses.

Alternatively, when the stereoscopic glasses 10 are to be worn by a user already wearing glasses, the rear sections of the stereoscopic temples 18 are set to clamp the temporal sections of the user's head from the outer side of the temples of the already-worn glasses or at a position above the temples of the already-worn glasses.

By placing the stopper segment 30 of the engagement section 22 included in the stereoscopic frame 14 onto the bridge 4C of the frame 4 of the glasses 2 already worn by the user, the stereoscopic optical components 12 can be positionally maintained in front of the lenses 6 of the glasses 2.

Consequently, with such simple operation of placing the stopper segment 30 on the bridge 4C, the stereoscopic frame 14 can be worn over the frame 4 of the glasses 2 already worn by the user, thereby advantageously allowing for easier wearability.

In addition, the stable positioning of the stereoscopic optical components 12 in front of the lenses 6 of the already-worn glasses 2 advantageously allows for reliable stereoscopic operation of three-dimensional images.

Furthermore, the third embodiment is advantageous in terms of simple configuration and cost reduction since the engagement section 22 can be formed by only a single stopper segment 30.

Fourth Embodiment

A fourth embodiment of the present invention will now be described with reference to FIGS. 7A to 8C.

Since the frame 4 of the glasses 2 can take various designs, the height of the bridge 4C relative to the lenses 6 or the rims 4A can also vary.

Therefore, if the height of the stopper segment 30 relative to the stereoscopic bridge 20 is fixed, as in the third embodiment, there is a possibility that the field of view through the glasses 2 may not match the field of view through the stereoscopic glasses 10, depending on the design of the glasses 2. There is also a possibility that the upper rim segments 1602 or the lower rim segments 1604 of the stereoscopic rims 16 may interfere with the user's vision.

In light of this, in the fourth embodiment, the height of the stopper segment 30 relative to the stereoscopic bridge 20 is made adjustable.

Figure 7A:
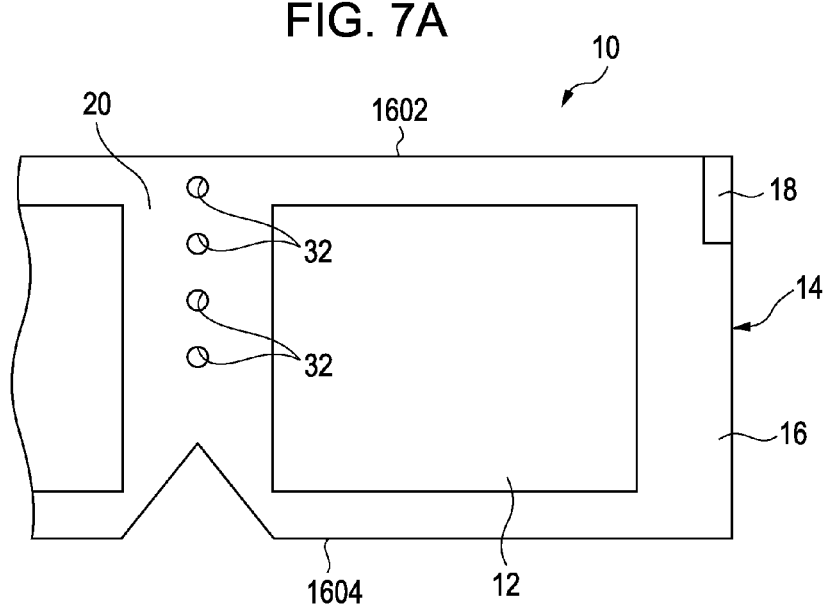
FIG. 7A is a rear view of stereoscopic glasses 10 according to a fourth embodiment of the present invention.

Referring to FIG. 7A, the rear surface of the stereoscopic bridge 20 is provided with a plurality of attachment holes 32 that are vertically spaced apart from each other along the middle of the stereoscopic bridge 20 in the left-right direction.

Figure 7B:
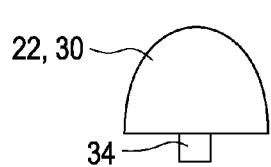
FIGS. 7B and 7C are a plan view and a front view, respectively, of a stopper segment 30 according to the fourth embodiment.
Figure 7D:
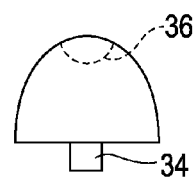
FIGS. 7D and 7E are a plan view and a front view, respectively, of a modification of the stopper segment 30 according to the fourth embodiment.
Figure 7C:
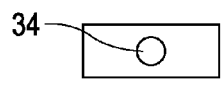

Referring to FIGS. 7B and 7C, the stopper segment 30 has an attachment shaft 34 that is fittable in the attachment holes 32. The stopper segment 30 can be attached to or detached from the stereoscopic bridge 20 by fitting or removing the attachment shaft 34 into or from one of the attachment holes 32.

Consequently, by selecting one of the attachment holes 32 and fitting the attachment shaft 34 into the selected attachment hole 32, the height of the stopper segment 30 relative to the stereoscopic bridge 20 is adjusted.

In a state where the stopper segment 30 is attached to the stereoscopic bridge 20, the stopper segment 30 protrudes rearward by a length that prevents the stereoscopic glasses 10 from touching the user's eyelids when the stereoscopic glasses 10 are worn by a user not wearing glasses. In other words, the stopper segment 30 is made so that a user not wearing glasses is able to wear the stereoscopic glasses 10 like common glasses without any trouble.

It is needless to say that the fourth embodiment can achieve the same advantages as those of the third embodiment.

In addition, the height of the stopper segment 30 relative to the stereoscopic bridge 20 can be adjusted so that the field of view through the glasses 2 matches the field of view through the stereoscopic glasses 10 even for a user wearing glasses 2 of various designs. Moreover, the height of the stopper segment 30 relative to the stereoscopic bridge 20 can be adjusted so that the user's vision is not interfered by the upper rim segments 1602 or the lower rim segments 1604 of the stereoscopic rims 16.

This is advantageous in terms of reliable stereoscopic operation as well as enhanced user-friendliness of the stereoscopic glasses 10.

Figure 7E:
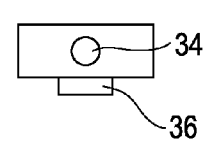
Figure 8C:
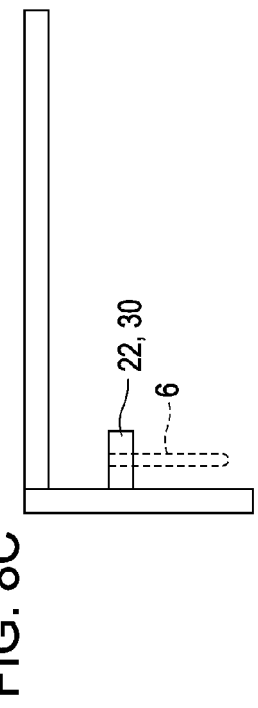
FIGS. 8A, 8B, and 8C are a plan view, a front view, and a side view, respectively, of the stereoscopic glasses 10 according to the fourth embodiment in use.
Figure 8A:
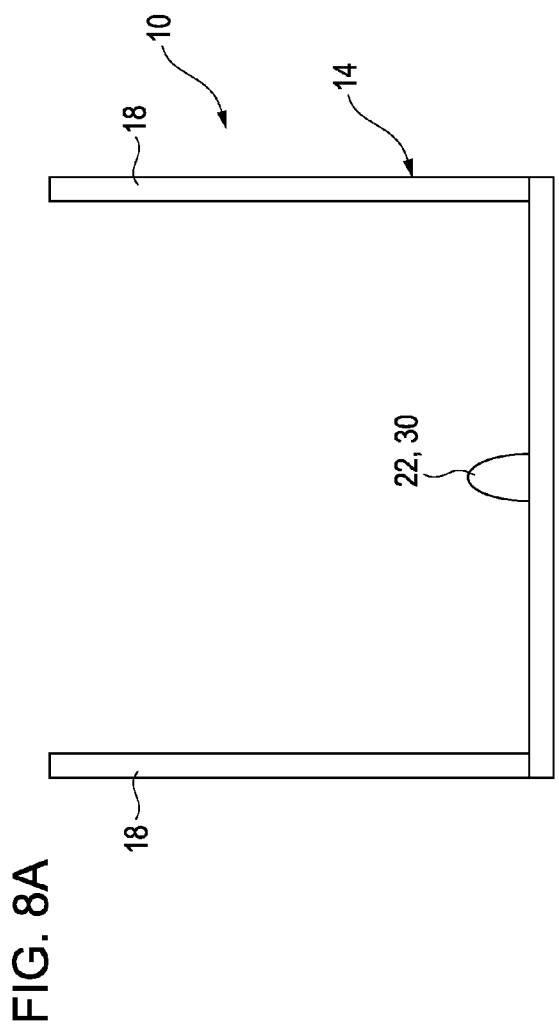
Figure 8B:
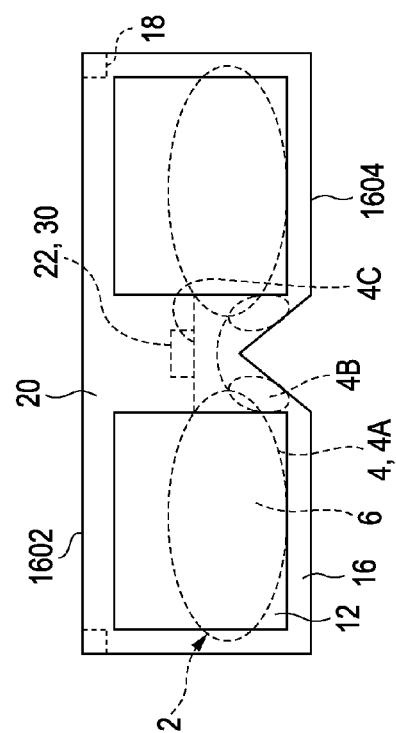

Referring to FIGS. 7D and 7E, in the fourth embodiment, a downward projection 36 may be provided at an end of the stopper segment 30 most distant from the stereoscopic bridge 20.

This projection 36 can be secured to the bridge 4C of the frame 4 of the glasses 2. By securing the projection 36 to the bridge 4C, forward movement of the stereoscopic optical components 12 can be prevented.

With the projection 36, when the stereoscopic glasses 10 are worn over the glasses 2, forward movement of the stereoscopic optical components 12 is reliably prevented even when the user tilts his/her head downward since the projection 36 is secured to the bridge 4C of the glasses 2.

In consequence, the fourth embodiment is further advantageous in terms of stable positioning of the stereoscopic optical components 12 in front of the lenses 6 of the already-worn glasses 2, thereby advantageously allowing for reliable stereoscopic operation of three-dimensional images.

Fifth Embodiment

A fifth embodiment of the present invention will now be described with reference to FIGS. 9A to 10D.

The fifth embodiment is a modification of the fourth embodiment.

Figure 9A:
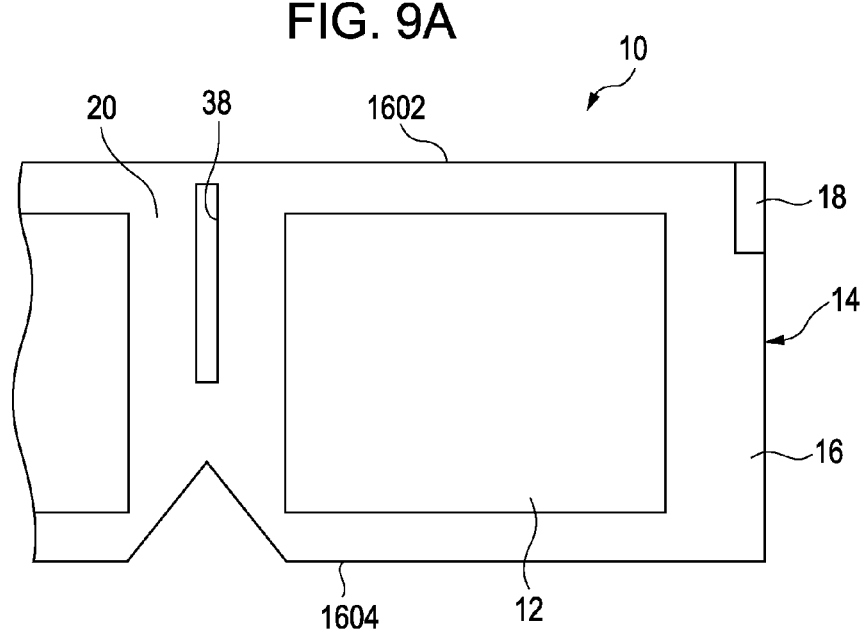
FIG. 9A is a rear view of stereoscopic glasses 10 according to a fifth embodiment of the present invention.
Figure 9B:
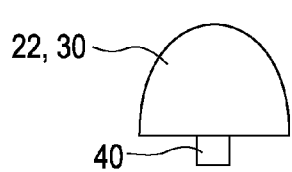
FIGS. 9B and 9C are a plan view and a front view, respectively, of a stopper segment 30 according to the fifth embodiment.

Referring to FIGS. 9A and 10A, the stereoscopic bridge 20 is provided with a single attachment slit 38 extending longitudinally in the vertical direction.

The attachment slit 38 is defined by serrated edges 3802.

Referring to FIGS. 9B and 9C and FIGS. 10B, 10C, and 10D, the stopper segment 30 has an attachment shaft 40 that is fittable in the attachment slit 38.

The attachment shaft 40 is rectangular in cross section and has a serrated periphery 4002 that is engageable with the serrated edges 3802 of the attachment slit 38.

By selecting the vertical position of the attachment slit 38 and engaging the attachment shaft 40 thereto, the height of the stopper segment 30 relative to the stereoscopic bridge 20 is adjusted.

In a state where the stopper segment 30 is attached to the stereoscopic bridge 20, the stopper segment 30 protrudes rearward by a length that prevents the stereoscopic glasses 10 from touching the user's eyelids when the stereoscopic glasses 10 are worn by a user not wearing glasses. In other words, the stopper segment 30 is made so that a user not wearing glasses is able to wear the stereoscopic glasses 10 like common glasses without any trouble.

The fifth embodiment achieves the same advantages as those of the fourth embodiment.

In addition, the fifth embodiment is also advantageous in that, by forming the serrations of the attachment slit 38 and the attachment shaft 40 at a short pitch, the height of the stopper segment 30 relative to the stereoscopic bridge 20 can be finely adjusted.

Figure 9D:
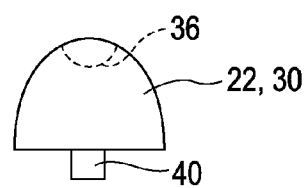
FIGS. 9D and 9E are a plan view and a front view, respectively, of a modification of the stopper segment 30 according the fifth embodiment.
Figure 9C:
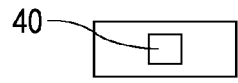
Figure 9E:
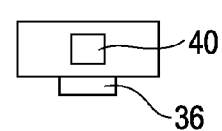

Referring to FIGS. 9D and 9E, in the fifth embodiment, a downward projection 36 may be provided at an end of the stopper segment 30 most distant from the stereoscopic bridge 20.

This projection 36 can be secured to the bridge 4C of the frame 4 of the glasses 2. By securing the projection to the bridge 4C, forward movement of the stereoscopic optical components 12 can be prevented.

With the projection 36, when the stereoscopic glasses 10 are worn over the glasses 2, forward movement of the stereoscopic optical components 12 is reliably prevented even when the user tilts his/her head downward since the projection 36 is secured to the bridge 4C of the glasses 2.

In consequence, the fifth embodiment is further advantageous in terms of stable positioning of the stereoscopic optical components 12 in front of the lenses 6 of the already-worn glasses 2, thereby advantageously allowing for reliable stereoscopic operation of three-dimensional images.

Sixth Embodiment

A sixth embodiment of the present invention will now be described with reference to FIGS. 10A to 11.

The sixth embodiment differs from the fifth embodiment in that the attachment shaft 40 is vertically movable while being fitted in the attachment slit 38.

Figure 11:
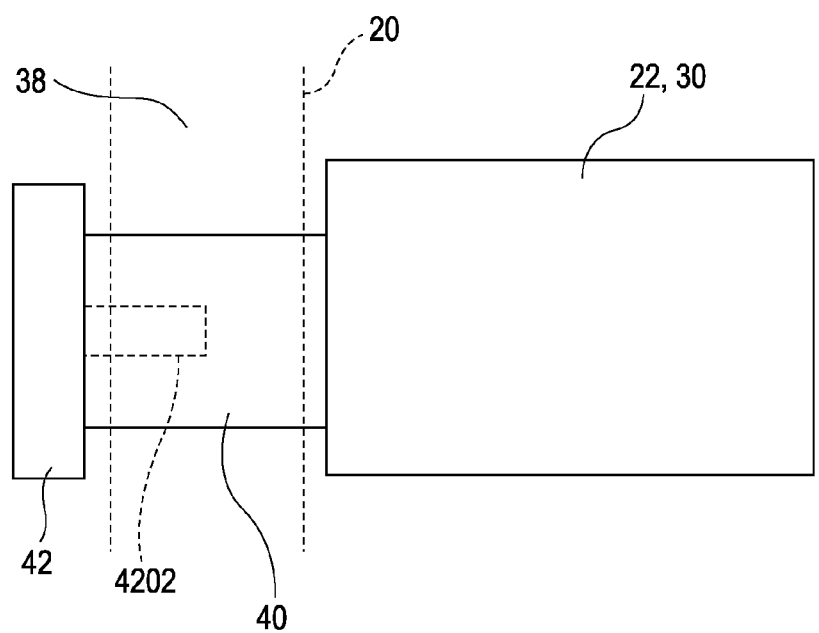
FIG. 11 is a side view of a stopper segment 30 according to a sixth embodiment.

As shown in FIG. 11, the attachment slit 38 is formed such that it extends through the stereoscopic bridge 20.

The attachment shaft 40 fitted in the attachment slit 38 has a length such that the tip of the attachment shaft 40 protrudes from the front surface of the stereoscopic bridge 20 when the base-end surface of the stopper segment 30 is in abutment with the rear surface of the stereoscopic bridge 20.

A retaining member 42 is attached to the protruding tip (i.e., the rear tip) of the attachment shaft 40 by means of a pin 4202.

The retaining member 42 has a width that is larger than the width of the attachment slit 38. By securing the retaining member 42 to the edges of the attachment slit 38, the attachment shaft 40 can be prevented from falling off from the attachment slit 38.

As shown in FIGS. 10A and 10C, a distance B between opposite sides of the serrated periphery 4002 of the attachment shaft 40 is slightly greater than a distance A between the opposing serrated edges 3802 of the attachment slit 38.

The stereoscopic bridge 20 and the attachment shaft 40 are formed of an elastic material at least where the serrated edges 3802 and the serrated periphery 4002 are provided. Such an elastic material may be, for example, synthetic resin having elasticity or rubber.

In the state where the serrated periphery 4002 of the attachment shaft 40 is fitted in the serrated edges 3802 of the attachment slit 38, the stopper segment 30 is manually held and moved in the vertical direction.

This causes the serrated periphery 4002 and the serrated edges 3802 engaged with the serrated periphery 4002 to deform, thereby permitting vertical movement of the attachment shaft 40.

When the user's hand is removed from the stopper segment 30 at a desired position, the serrated periphery 4002 and the serrated edges 3802 engage so that the stopper segment 30 is maintained at a desired height.

In other words, by vertically moving the stopper segment 30, the height of the stopper segment 30 relative to the stereoscopic bridge 20 is adjusted.

It is needless to say that the sixth embodiment can achieve the same advantages as those of the fifth embodiment.

In addition, when the height of the stopper segment 30 relative to the stereoscopic bridge 20 is to be adjusted, it is not necessary to temporarily remove the stopper segment 30 from the attachment slit 38 and then fit the stopper segment 30 again into the attachment slit 38, thereby advantageously achieving enhanced operability. Since the stopper segment 30 is not removed from the attachment slit 38, the sixth embodiment is advantageous in terms of prevention of loss of the stopper segment 30 as well as enhanced user-friendliness.

Seventh Embodiment

A seventh embodiment of the present invention will now be described with reference to FIGS. 12A to 12C.

The seventh embodiment is a modification of the third embodiment and differs from the third embodiment in that the engagement section 22 includes a pair of clamping segments 44, as shown in FIGS. 12A, 12B, and 12C.

The two clamping segments 44 protrude rearward from the stereoscopic bridge 20 and clamp the bridge 4C of the frame 4 of the glasses 2 from above and below.

In a state where the clamping segments 44 are attached to the stereoscopic bridge 20, the clamping segments 44 protrude rearward by a length that prevents the stereoscopic glasses 10 from touching the user's eyelids when the stereoscopic glasses 10 are worn by a user not wearing glasses. In other words, the clamping segments 44 are made so that a user not wearing glasses is able to wear the stereoscopic glasses 10 like common glasses without any trouble.

It is needless to say that the seventh embodiment can achieve the same advantages as those of the third embodiment.

In addition, since the two clamping segments 44 clamp the bridge 4C of the frame 4 of the glasses 2, the seventh embodiment is further advantageous in terms of stable positioning of the stereoscopic optical components 12 in front of the lenses 6 of the already-worn glasses 2, thereby advantageously allowing for reliable stereoscopic operation of three-dimensional images.

Eighth Embodiment

An eighth embodiment of the present invention will now be described with reference to FIG. 13.

The eighth embodiment is a modification of the seventh embodiment and differs from the seventh embodiment in that the height of the clamping segments 44 relative to the stereoscopic bridge 20 is made adjustable, like the fourth embodiment.

Referring to FIG. 13, the stereoscopic bridge 20 is provided with a single attachment slit 46 extending longitudinally in the vertical direction.

The attachment slit 46 is defined by serrated edges 4602.

The clamping segments 44 each have an attachment shaft 48 that is fittable in the attachment slit 46.

Each attachment shaft 48 is rectangular in cross section and has a serrated periphery 4802 that is engageable with the serrated edges 4602 of the attachment slit 46.

By selecting the vertical position of the attachment slit 46 and engaging the attachment shafts 48 thereto, the height of the clamping segments 44 relative to the stereoscopic bridge 20 is adjusted.

The eighth embodiment achieves the same advantages as those of the seventh embodiment.

In addition, the height of the clamping segments 44 relative to the stereoscopic bridge 20 can be adjusted so that the field of view through the glasses 2 matches the field of view through the stereoscopic glasses 10 even for a user wearing glasses 2 of various designs. Moreover, the height of the clamping segments 44 relative to the stereoscopic bridge 20 can be adjusted so that the user's vision is not interfered by the upper rim segments 1602 or the lower rim segments 1604 of the stereoscopic rims 16.

This is advantageous in terms of reliable stereoscopic operation as well as enhanced user-friendliness of the stereoscopic glasses 10.

In addition, the eighth embodiment is also advantageous in that, by forming the serrations of the attachment slit 46 and the attachment shafts 48 at a short pitch, the height of the clamping segments 44 relative to the stereoscopic bridge 20 can be finely adjusted.

In the eighth embodiment, the dimensions of the serrated edges 4602 and the serrated periphery 4802 may be set similar to the dimensions in the sixth embodiment so that the height adjustment of the clamping segments 44 can be implemented in the state where the attachment shafts 48 are fitted in the attachment slit 46.

Furthermore, a retaining member 42 similar to that in the sixth embodiment may be attached to the tip of the attachment shaft 48 of each clamping segment 44. This is advantageous in terms of prevention of loss of the clamping segments 44 as well as enhanced user-friendliness.

Ninth Embodiment

A ninth embodiment of the present invention will now be described with reference to FIGS. 14A to 14C.

In the ninth embodiment, the engagement section 22 includes a single stopper segment 50, as shown in FIGS. 14A, 14B, and 14C.

The stereoscopic frame 14 includes the stereoscopic bridge 20 that connects the two stereoscopic rims 16.

The engagement section 22 includes a single stopper segment 50 that protrudes rearward from the upper rim segments 1602 of the two stereoscopic rims 16 as well as from an upper edge 2010 of the stereoscopic bridge 20 and that can be placed on the rims 4A of the frame 4 of the glasses 2 (see FIGS. 3A to 3C) from above.

The stopper segment 50 is formed to have dimensions such that left and right ends of the stopper segment 50 are disposed inward of the outer rim segments 1606 of the two stereoscopic rims 16. The left and right ends of the stopper segment 50 and the two temples 18 respectively have gaps 51 formed therebetween.

The stopper segment 50 has a convex shape that protrudes rearward, and the midsection thereof in the left-right width direction is the most rearward protruding section.

The stopper segment 50 protrudes rearward by a length that prevents the stereoscopic glasses 10 from touching the user's eyelids when the stereoscopic glasses 10 are worn by a user not wearing glasses. In other words, the stopper segment 50 is made so that a user not wearing glasses is able to wear the stereoscopic glasses 10 like common glasses without any trouble.

In the ninth embodiment, when the stereoscopic glasses 10 are to be worn by a user already wearing glasses, the rear sections of the stereoscopic temples 18 are hooked onto the user's ears from the outer side of the temples of the already-worn glasses or at a position above the temples of the already-worn glasses.

Alternatively, when the stereoscopic glasses 10 are to be worn by a user already wearing glasses, the rear sections of the stereoscopic temples 18 are set to clamp the temporal sections of the user's head from the outer side of the temples of the already-worn glasses or at a position above the temples of the already-worn glasses.

By placing the single stopper segment 50 of the engagement section 22 included in the stereoscopic frame 14 over the two rims 4A of the frame 4 of the glasses 2 already worn by the user, the stereoscopic optical components 12 can be positionally maintained in front of the lenses 6 of the glasses 2.

Consequently, with such simple operation of placing the single stopper segment 50 over the two rims 4A, the stereoscopic frame 14 can be worn over the frame 4 of the glasses 2 already worn by the user, thereby advantageously allowing for easier wearability.

In addition, the stable positioning of the stereoscopic optical components 12 in front of the lenses 6 of the already-worn glasses 2 advantageously allows for reliable stereoscopic operation of three-dimensional images.

Furthermore, the ninth embodiment is advantageous in terms of simple configuration and cost reduction of the stereoscopic glasses 10 since only a single stopper segment 50 is necessary.

Tenth Embodiment

A tenth embodiment of the present invention will now be described with reference to FIGS. 15A to 16C.

The tenth embodiment is a modification of the ninth embodiment and differs from the ninth embodiment in that the stopper segment 50 is provided with two projections 52, as shown in FIGS. 15A, 15B, and 15C.

Referring to FIGS. 16A, 16B, and 16C, the two projections 52 can be secured to the rims 4A of the frame 4 of the glasses 2 or to the lenses 6 held by these rims 4A. By securing the projections 52 to the rims 4A or the lenses 6, forward movement of the stereoscopic optical components 12 can be prevented.

In this embodiment, the two projections 52 protrude downward from near opposite widthwise ends at the rear section of the stopper segment 50.

When the stereoscopic glasses 10 are worn over the glasses 2, forward movement of the stereoscopic optical components 12 is reliably prevented even when the user tilts his/her head downward since the projections 52 are secured to the rims 4A or the lenses 6 of the glasses 2.

In consequence, the tenth embodiment is further advantageous in terms of stable positioning of the stereoscopic optical components 12 in front of the lenses 6 of the already-worn glasses 2, thereby advantageously allowing for reliable stereoscopic operation of three-dimensional images.

Providing the two projections 52 near the opposite ends of the stopper segment 50 as in this embodiment ensures a large distance between the two projections 52 in the left-right direction. This is further advantageous in that the stereoscopic optical components 12 can be stably positioned in front of the lenses 6 of the glasses 2.

Eleventh Embodiment

An eleventh embodiment of the present invention will now be described with reference to FIGS. 17A to 18C.

Since the frame 4 of the glasses 2 can take various designs, the height of the rims 4A can also vary.

Therefore, if the height of the stopper segment 50 relative to the stereoscopic rims 16 is fixed, as in the tenth embodiment, there is a possibility that the field of view through the glasses 2 may not match the field of view through the stereoscopic glasses 10, depending on the design of the glasses 2. There is also a possibility that the upper rim segments 1602 or the lower rim segments 1604 of the stereoscopic rims 16 may interfere with the user's vision.

In light of this, in the eleventh embodiment, the height of the stopper segment 50 relative to the stereoscopic rims 16 is made adjustable, as in the fifth embodiment (FIGS. 10A to 10D).

Referring to FIG. 17A, the outer rim segments 1606 of the two stereoscopic rims 16 are each provided with a single attachment slit 54 extending longitudinally in the vertical direction.

Similar to the fifth embodiment shown in FIGS. 10A to 10D, each attachment slit 54 is defined by serrated edges 5402.

Referring to FIGS. 17B and 17C, the stopper segment 50 has two attachment shafts 56 that are fittable in the respective attachment slits 54.

Similar to the fifth embodiment shown in FIGS. 10A to 10D, the two attachment shafts 56 are rectangular in cross section and each have a serrated periphery 5602 that is engageable with the serrated edges 5402 of the corresponding attachment slit 54.

Figure 18A:
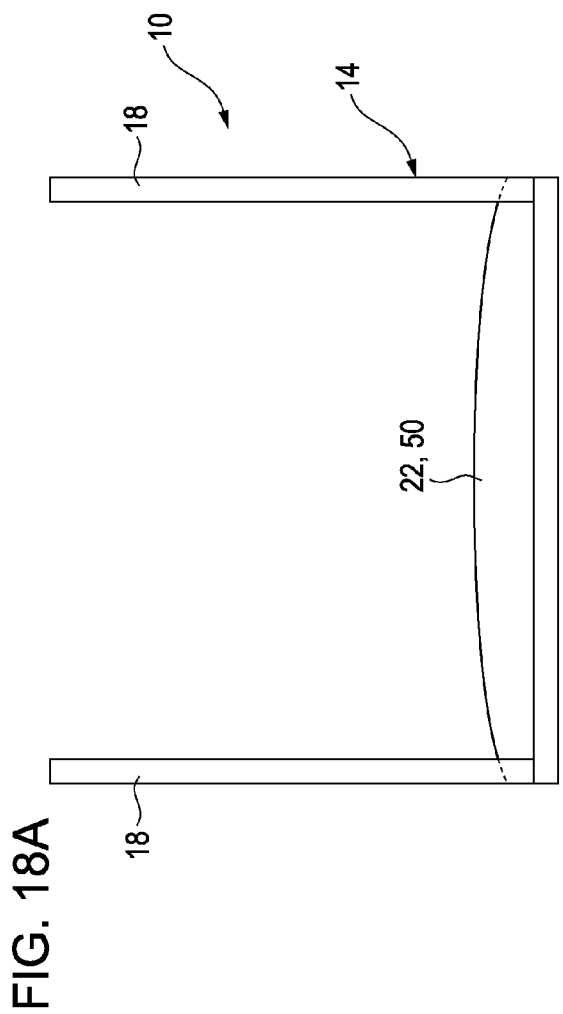
FIGS. 18A, 18B, and 18C are a plan view, a front view, and a side view, respectively, of the stereoscopic glasses 10 according to the eleventh embodiment in use.
Figure 18B:
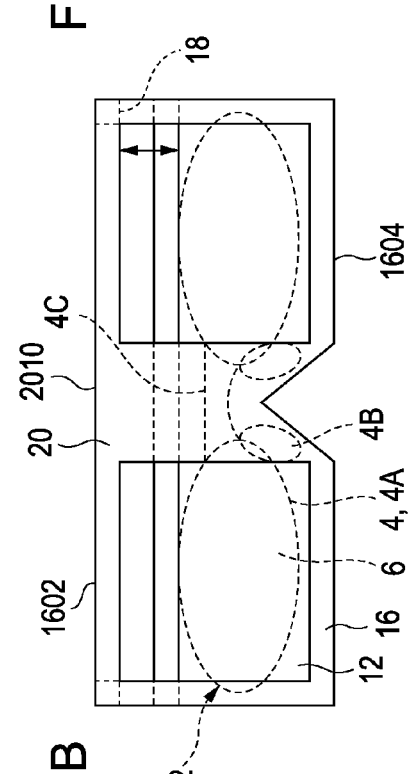
Figure 18C:
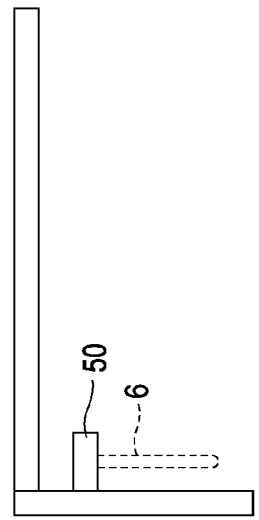

Referring to FIGS. 18A to 18C, by selecting the vertical position of the attachment slits 54 and engaging the attachment shafts 56 thereto, the height of the stopper segment 50 relative to the two stereoscopic rims 16 is adjusted.

The eleventh embodiment achieves the same advantages as those of the tenth embodiment.

In addition, the height of the stopper segment 50 relative to the stereoscopic rims 16 can be adjusted so that the field of view through the glasses 2 matches the field of view through the stereoscopic glasses 10 even for a user wearing glasses 2 of various designs. Moreover, the height of the stopper segment 50 relative to the stereoscopic rims 16 can be adjusted so that the user's vision is not interfered by the upper rim segments 1602 or the lower rim segments 1604 of the stereoscopic rims 16.

This is advantageous in terms of reliable stereoscopic operation as well as enhanced user-friendliness of the stereoscopic glasses 10.

In addition, the eleventh embodiment is also advantageous in that, by forming the serrations of the attachment slits 54 and the attachment shafts 56 at a short pitch, the height of the stopper segment 50 relative to the stereoscopic rims 16 can be finely adjusted.

In the eleventh embodiment, the dimensions of the serrated edges 5402 and the serrated periphery 5602 may be set similar to the dimensions in the sixth embodiment so that the height adjustment of the stopper segment 50 can be implemented in the state where the attachment shafts 56 are fitted in the attachment slits 54.

Furthermore, a retaining member 42 similar to that in the sixth embodiment may be attached to the tip of each attachment shaft 56 of the stopper segment 50. This is advantageous in terms of prevention of loss of the stopper segment 50 as well as enhanced user-friendliness.

Twelfth Embodiment

A twelfth embodiment of the present invention will now be described with reference to FIGS. 19A to 19C.

The twelfth embodiment is a modification of the eleventh embodiment and differs from the eleventh embodiment in that a single attachment slit 54 is provided instead of two, and that a single attachment shaft 56 is provided instead of two.

Referring to FIG. 12A, the midsection of the stereoscopic bridge 20 in the width direction is provided with a single attachment slit 54 extending longitudinally in the vertical direction.

Like the fifth embodiment shown in FIGS. 10A to 10D, the attachment slit 54 is defined by serrated edges 5402.

The stopper segment 50 has a single attachment shaft 56 that is fittable in the attachment slit 54.

Similar to the fifth embodiment shown in FIGS. 10A to 10D, the attachment shaft 56 is rectangular in cross section and has a serrated periphery 5602 that is engageable with the serrated edges 5402 of the attachment slit 54.

By selecting the vertical position of the attachment slit 54 and engaging the attachment shaft 56 thereto, the height of the stopper segment 50 relative to the two stereoscopic rims 16 is adjusted.

The twelfth embodiment achieves the same advantages as those of the eleventh embodiment.

In the twelfth embodiment, the dimensions of the serrated edges 5402 and the serrated periphery 5602 may be set similar to the dimensions in the sixth embodiment so that the height adjustment of the stopper segment 50 can be implemented in the state where the attachment shaft 56 is fitted in the attachment slit 54.

Furthermore, a retaining member 42 similar to that in the sixth embodiment may be attached to the tip of the attachment shaft 56 of the stopper segment 50. This is advantageous in terms of prevention of loss of the stopper segment 50 as well as enhanced user-friendliness.

Thirteenth Embodiment

A thirteenth embodiment of the present invention will now be described with reference to FIGS. 20A to 21C.

The thirteenth embodiment is a modification of the first embodiment and differs from the first embodiment in that the height of the stopper segments 26 relative to the stereoscopic rims 16 is made adjustable, as in the eleventh and twelfth embodiments.

Figure 20A:
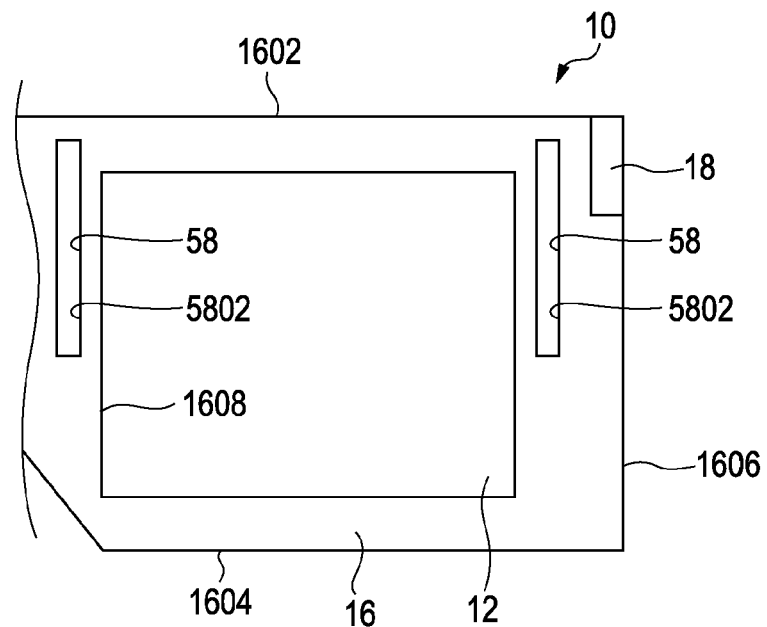
FIG. 20A is a rear view of stereoscopic glasses 10 according to a thirteenth embodiment of the present invention.

Referring to FIG. 20A, the outer rim segment 1606 and the inner rim segment 1608 of each of the two stereoscopic rims 16 are provided with attachment slits 58 extending longitudinally in the vertical direction.

Similar to the fifth embodiment shown in FIGS. 10A to 10D, each attachment slit 58 is defined by serrated edges 5802.

Figure 20B:
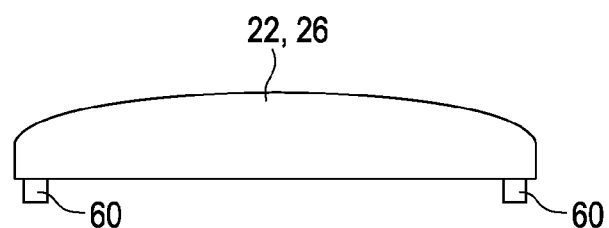
FIGS. 20B and 20C are a plan view and a front view, respectively, of a stopper segment 26 according to the thirteenth embodiment.
Figure 20C:
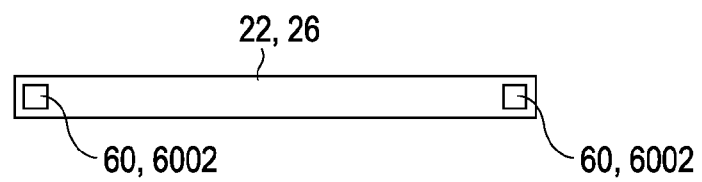

Referring to FIGS. 20B and 20C, the stopper segments 26 each have a width that extends between the outer rim segment 1606 and the inner rim segment 1608 of the corresponding stereoscopic rim 16.

The stopper segments 26 each have a convex shape that protrudes rearward, and the midsection thereof in the left-right width direction is the most rearward protruding section.

The stopper segments 26 protrude rearward by a length that prevents the stereoscopic glasses 10 from touching the user's eyelids when the stereoscopic glasses 10 are worn by a user not wearing glasses. In other words, the stopper segments 26 are made so that a user not wearing glasses is able to wear the stereoscopic glasses 10 like common glasses without any trouble.

The stopper segments 26 each include two attachment shafts 60 that are fittable in the attachment slits 58.

Specifically, as shown in FIGS. 20B and 20C, each stopper segment 26 has two attachment shafts 60 respectively fittable in the corresponding pair of attachment slits 58.

Similar to the fifth embodiment shown in FIGS. 10A to 10D, the attachment shafts 60 are rectangular in cross section and each have a serrated periphery 6002 that is engageable with the serrated edges 5802 of the corresponding attachment slit 58.

Figure 21C:
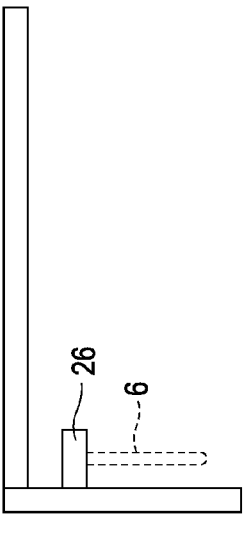
FIGS. 21A, 21B, and 21C are a plan view, a front view, and a side view, respectively, of the stereoscopic glasses 10 according to the thirteenth embodiment in use.
Figure 21A:
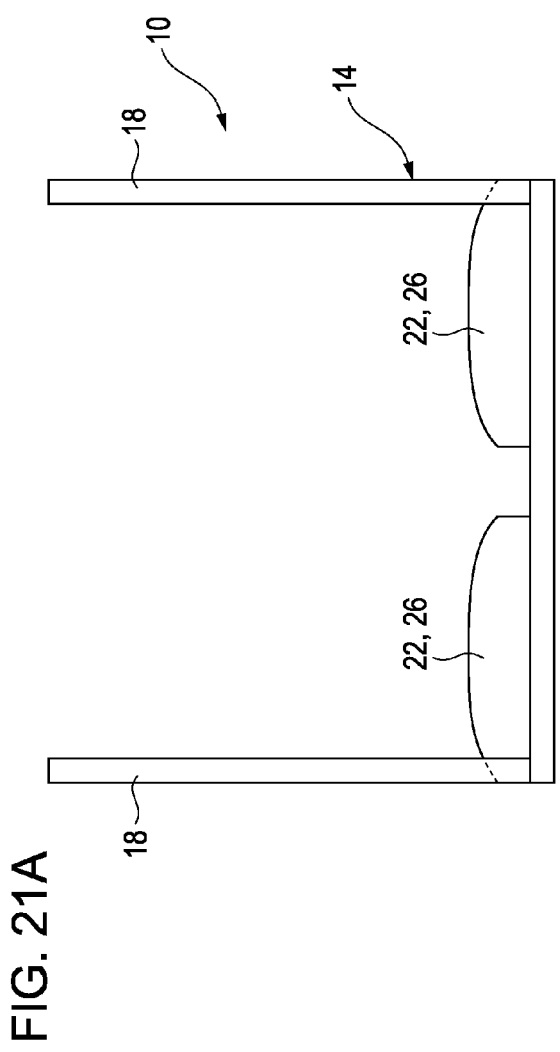
Figure 21B:
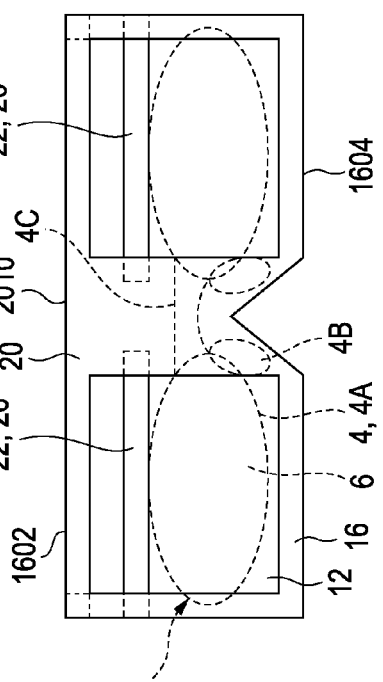

As shown in FIGS. 21A to 21C, by selecting the vertical position of the attachment slits 58 and engaging the attachment shafts 60 thereto, the height of the stopper segments 26 relative to the stereoscopic rims 16 is adjusted.

The thirteenth embodiment achieves the same advantages as those of the first embodiment.

In addition, the height of the stopper segments 26 relative to the stereoscopic rims 16 can be adjusted so that the field of view through the glasses 2 matches the field of view through the stereoscopic glasses 10 even for a user wearing glasses 2 of various designs. Moreover, the height of the stopper segments 26 relative to the stereoscopic rims 16 can be adjusted so that the user's vision is not interfered by the upper rim segments 1602 or the lower rim segments 1604 of the stereoscopic rims 16.

This is advantageous in terms of reliable stereoscopic operation as well as enhanced user-friendliness of the stereoscopic glasses 10.

In addition, the thirteenth embodiment is also advantageous in that, by forming the serrations of the attachment slits 58 and the attachment shafts 60 at a short pitch, the height of the stopper segments 26 relative to the stereoscopic rims 16 can be finely adjusted.

In the thirteenth embodiment, the dimensions of the serrated edges 5802 and the serrated periphery 6002 may be set similar to the dimensions in the sixth embodiment so that the height adjustment of the stopper segments 26 can be implemented in the state where the attachment shafts 60 are fitted in the attachment slits 58.

Furthermore, a retaining member 42 similar to that in the sixth embodiment may be attached to the tip of each of the attachment shafts 60 of the stopper segments 26. This is advantageous in terms of prevention of loss of the stopper segments 26 as well as enhanced user-friendliness.

Fourteenth Embodiment

A fourteenth embodiment of the present invention will now be described with reference to FIGS. 22A to 22E.

The fourteenth embodiment differs from the above embodiments in that stopper segments 62 included in the engagement section 22 are rotatably attached to the frame 14.

Specifically, the upper rim segments 1602 of the stereoscopic rims 16 of the frame 14 are each provided with an upward-facing recess 64 for accommodating the corresponding stopper segment 62.

The stopper segments 62 each have a linear base portion 62A and a circular-arc end portion 62B. The base portion 62A and the end portion 62B are formed to have a width that can be accommodated within the recess 64.

A pair of spindles 66 protrudes respectively from opposite ends of each stopper segment 62 in the width direction. These spindles 66 are engaged with bearing holes 68 provided at opposite end surfaces of the corresponding recess 64 so that the stopper segment 62 is joined to the corresponding stereoscopic rim 16. The engagement between the spindles 66 and the bearing holes 68 is such that the stopper segment 62 can be manually rotated by the user and can be securely maintained in the rotated position when the user releases his/her hand therefrom.

As shown in FIG. 22C, when the stopper segments 62 protrude rearward at a right angle from the stereoscopic rims 16, the stopper segments 62 are in a securing position in which the stopper segments 62 are securable to the glasses 2.

Specifically, by placing the stopper segments 62 onto the rims 4A of the frame 4 of the glasses 2 already worn by the user, the stereoscopic optical components 12 can be positionally maintained in front of the lenses 6 of the glasses 2.

On the other hand, FIG. 22B shows a non-securing position in which the stopper segments 62 are rotated upward to the extension of the stereoscopic rims 16. This position is used when the stereoscopic glasses 10 are to be worn by a user not wearing glasses.

In other words, when the stereoscopic glasses 10 are to be worn by a user not wearing glasses, the stopper segments 62 are set in the non-securing position, and the rear sections of the stereoscopic temples 18 are hooked onto the user's ears or set to clamp the temporal sections of the user's head. In this case, the notch 2002 is hooked onto the user's nose such that the notch 2002 serves as a nosepiece, whereby the stereoscopic glasses 10 can be stably worn by the user.

The fourteenth embodiment is advantageous in that, when the stereoscopic glasses 10 are to be worn by a user not wearing glasses, the stopper segments 62 are positioned distantly in front of the user's eyelids since the stopper segments 62 are set in the non-securing position, thereby allowing for enhanced wearability of the stereoscopic glasses 10.

Fifteenth Embodiment

A fifteenth embodiment of the present invention will now be described with reference to FIGS. 23A to 23E.

The fifteenth embodiment is a modification of the fourteenth embodiment and differs from the fourteenth embodiment in that the stopper segments 62 are each provided with a projection 70, as shown in FIGS. 23A, 23B, and 23C.

The projections 70 are each provided in the midsection, in the width direction, of the end portion 62B of the stopper segment 62 most distant from the corresponding recess 64.

When the stopper segments 62 are in the securing position, the projections 70 can be secured to the rims 4A of the frame 4 of the glasses 2 or to the lenses 6 held by these rims 4A. By securing the projections 70 to the rims 4A or the lenses 6, forward movement of the stereoscopic optical components 12 can be prevented.

When the stereoscopic glasses 10 are worn over the glasses 2, forward movement of the stereoscopic optical components 12 is reliably prevented even when the user tilts his/her head downward since the projections 70 are secured to the rims 4A or the lenses 6 of the glasses 2.

In consequence, the fifteenth embodiment is further advantageous in terms of stable positioning of the stereoscopic optical components 12 in front of the lenses 6 of the already-worn glasses 2, thereby advantageously allowing for reliable stereoscopic operation of three-dimensional images.

Sixteenth Embodiment

A sixteenth embodiment of the present invention will now be described with reference to FIGS. 24 to 26C.

In contrast to the first to fifteenth embodiments described above in which the frame 14 is formed of synthetic resin or rubber, the frame in the sixteenth embodiment is formed of paper.

Figure 25:
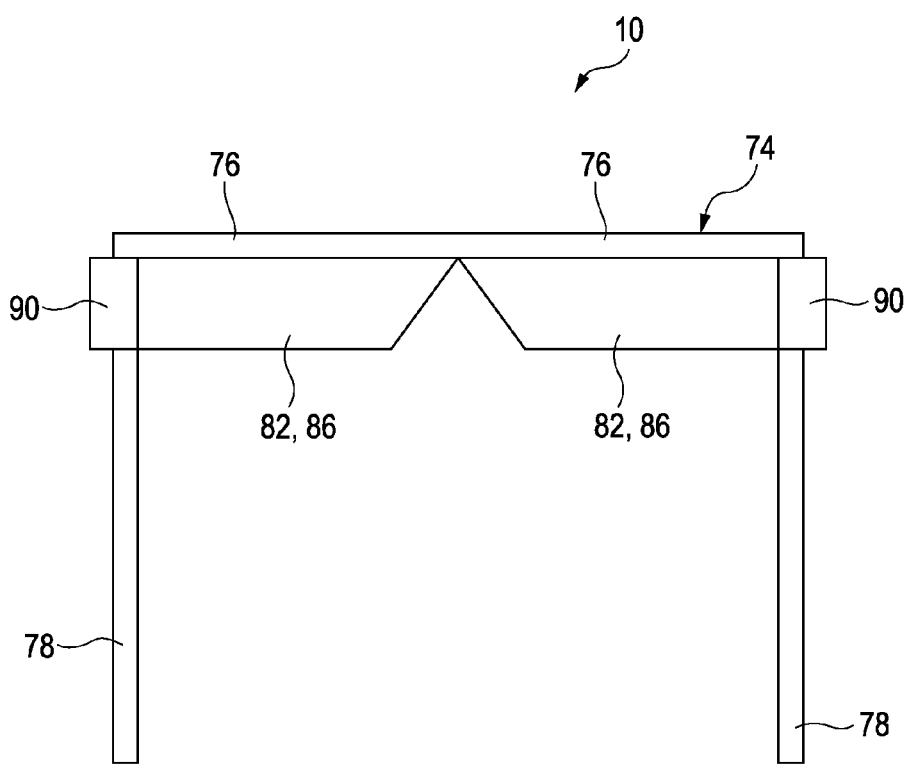
FIG. 25 is a plan view of the stereoscopic glasses 10 according to the sixteenth embodiment.

Referring to FIGS. 24 and 25, the pair of stereoscopic glasses 10 includes two stereoscopic optical components 12 and a frame 74 that holds these stereoscopic optical components 12.

The frame 74 is formed of a single sheet of paper.

The frame 74 includes a pair of left and right stereoscopic rims 76, a pair of left and right stereoscopic temples 78, a stereoscopic bridge 80, and an engagement section 82.

The stereoscopic rims 76 each have a rectangular frame-like shape.

A peripheral area of each stereoscopic optical component 12 is bonded to the front surface or the rear surface of the corresponding stereoscopic rim 76 with an adhesive.

The stereoscopic bridge 80 is provided between the two stereoscopic rims 76 and is configured to connect the two stereoscopic rims 76.

In this embodiment, the stereoscopic bridge 80 extends horizontally at the same height as the stereoscopic rims 76.

A lower section of the stereoscopic bridge 80 is provided with a notch 8002 that opens downward.

When a user already wearing glasses puts on the stereoscopic glasses 10, the user's nose is prevented from touching the stereoscopic bridge 80 by this notch 8002.

On the other hand, if the stereoscopic glasses 10 are to be worn by a user not wearing glasses, the notch 8002 allows the stereoscopic bridge 80 to be hooked onto the user's nose so that the stereoscopic glasses 10 can be worn by the user.

The two stereoscopic temples 78 are connected to upper sections of outer rim segments of the left and right stereoscopic rims 76, respectively, via fold lines 7602.

The two stereoscopic temples 78 each have a slender body with an end thereof serving as an ear-hook section 7802.

The two stereoscopic temples 78 are folded rearward along the fold lines 7602. The ear-hook sections 7802 of the two stereoscopic temples 78 are hooked around the user's ears so that the stereoscopic glasses 10 can be worn by the user.

In detail, when the stereoscopic glasses 10 are to be worn by a user already wearing glasses, the ear-hook sections 7802 of the stereoscopic temples 78 are hooked around the user's ears from the outer side of the temples of the already-worn glasses or at a position above the temples of the already-worn glasses.

When the stereoscopic glasses 10 are to be worn by a user not wearing glasses, the ear-hook sections 7802 of the stereoscopic temples 78 are hooked around the user's ears and the notch 8002 is hooked onto the user's nose to serve as a nosepiece, whereby the stereoscopic glasses 10 can be stably worn by the user.

The engagement section 82 is connected to the upper edges of the left and right stereoscopic rims 76 and the upper edge of the stereoscopic bridge 80 along a fold line 7604.

In a state where the stereoscopic optical components 12 are positioned in front of the lenses 6 of the glasses 2 already worn by the user, the engagement section 82 is brought into engagement with the rims 4A of the frame 4 of the glasses 2 so as to positionally maintain the stereoscopic optical components 12 in front of the lenses 6 of the glasses 2.

In this embodiment, the engagement section 82 includes two engagement sections in correspondence with the two stereoscopic rims 76.

Referring to FIGS. 25 and 26A, the stereoscopic rims 76 are folded rearward along the fold line 7604 so as to form two stopper segments 86 protruding rearward from the upper edges of the respective stereoscopic rims 76 and placeable on the rims 4A of the frame 4 of the glasses 2 from above.

In the folded state, the stopper segments 86 protrude rearward by a length that prevents the stereoscopic glasses 10 from touching the user's eyelids when the stereoscopic glasses 10 are worn by a user not wearing glasses. In other words, the stopper segments 86 are made so that a user not wearing glasses is able to wear the stereoscopic glasses 10 like common glasses without any trouble.

One end of each stopper segment 86 is provided with a projection segment 88 along a fold line 7606.

The projection segments 88 are each folded downward along the fold line 7606.

The projection segments 88 can be secured to the rims 4A of the frame 4 of the glasses 2 or to the lenses 6 held by these rims 4A. By securing the projection segments 88 to the rims 4A or the lenses 6, forward movement of the stereoscopic optical components 12 can be prevented.

When the stereoscopic glasses 10 are worn over the glasses 2, forward movement of the stereoscopic optical components 12 is reliably prevented even when the user tilts his/her head downward since the projection segments 88 are secured to the rims 4A or the lenses 6 of the glasses 2.

Furthermore, in this embodiment, the stopper segments 86 are respectively provided with retaining segments 90 for retaining the rearward-folded state of the stopper segments 86.

The retaining segments 90 are connected to outer ends of the stopper segments 86 in the width direction via fold lines 7608.

The retaining segments 90 extend long and narrow in parallel to the stereoscopic temples 78 and are separated from the stereoscopic temples 78 by cut lines 7610.

As shown in FIGS. 24 and 26A, the retaining segments 90 are each sectioned into three areas by fold lines 7612 and 7614, namely, a first bending section 9002, a second bending section 9004, a third bending section 9006 in that order from the adjacent stopper segment 86.

In a state where the two stereoscopic temples 78 are folded rearward along the respective fold lines 7602, the first bending sections 9002 are folded downward along the fold lines 7608 so as to be positioned inward of the stereoscopic temples 78, as shown in FIGS. 26A, 26B, and 26C.

The second bending sections 9004 are folded upward along the fold lines 7612 so as to overlie the outer side surfaces of the stereoscopic temples 78.

The third bending sections 9006 are folded downward along the fold lines 7614 so as to be sandwiched between the inner side surfaces of the stereoscopic temples 78 and the first bending sections 9002.

By folding the retaining segments 90 around the stereoscopic temples 78 in this manner, the rearward-folded state of the stopper segments 86 is retained.

It is needless to say that the sixteenth embodiment can achieve the same advantages as those of the first embodiment and that the sixteenth embodiment is extremely advantageous in terms of cost reduction since the stereoscopic frame 74 is formed of a single sheet of paper.

Although the above-described embodiments are directed to a pair of stereoscopic glasses in which the optical components held by the stereoscopic rims are stereoscopic optical components, the first to sixteenth embodiments can also be applied to glasses in which the optical components held by the stereoscopic rims are optical components other than stereoscopic optical components.

Specifically, for example, the optical components held by the stereoscopic rims may be solar-observation optical components used for observing the sun during, for example, an eclipse. It is needless to say that the optical components held by the stereoscopic rims can be used in glasses in which the optical components are intended for purposes other than a stereoscopic purpose.

In other words, the embodiments of the present invention are widely applicable to observation glasses including everything from stereoscopic glasses to solar-observation glasses.

A pair of observation glasses in this case includes a pair of left and right observation rims connected to each other and respectively holding observation optical components used for observation and an observation frame having observation temples extending rearward respectively from the observation rims. The observation frame is provided with an engagement section. In a state where the observation optical components are positioned in front of the lenses of glasses already worn by a user, the engagement section is brought into engagement with the rims or the bridge of the frame of the glasses so as to positionally maintain the observation optical components in front of the lenses of the glasses.

With such observation glasses, the same advantages as those of the first to sixteenth embodiments can be achieved.

For example, with simple engaging operation of the engagement section, the observation frame can be worn over the frame 4 of the glasses 2 already worn by the user, thereby advantageously allowing for easier wearability.

In addition, the stable positioning of the observation optical components in front of the lenses 6 of the already-worn glasses 2 advantageously allows for reliable observation of various kinds.

It should be understood by those skilled in the art that various modifications, combinations, sub-combinations and alterations may occur depending on design requirements and other factors insofar as they are within the scope of the appended claims or the equivalents thereof.

What is claimed is:

1. Stereoscopic glasses comprising:
a pair of left and right stereoscopic rims connected to each other and respectively holding stereoscopic optical components used when observing a stereoscopic image; and
a stereoscopic frame that includes stereoscopic temples extending rearward from the stereoscopic rims,
wherein the stereoscopic frame is provided with an engagement section that is brought into engagement with a rim or a bridge of a frame of glasses already worn by a user in a state where the stereoscopic optical components are positioned in front of the lenses of the glasses so that the stereoscopic optical components are positionally maintained in front of the lenses of the glasses,
wherein the stereoscopic rims each have an upper rim segment that extends along an upper edge of the corresponding stereoscopic optical component, and
wherein the engagement section includes two stopper segments protruding rearward respectively from the upper rim segments of the stereoscopic rims and removable from the rim of the frame of the glasses from above.

2. The stereoscopic glasses according to claim 1, wherein a rear section of each stopper segment is provided with a projection that is securable to the rim of the frame of the glasses or to the corresponding lens held by the rim, the projections being secured to the rim or the lenses so as to prevent forward movement of the stereoscopic optical components.

3. Stereoscopic glasses comprising:
a pair of left and right stereoscopic rims connected to each other and respectively holding stereoscopic optical components used when observing a stereoscopic image; and
a stereoscopic frame that includes stereoscopic temples extending rearward from the stereoscopic rims,
wherein the stereoscopic frame is provided with an engagement section that is brought into engagement with a rim or a bridge of a frame of glasses already worn by a user in a state where the stereoscopic optical components are positioned in front of the lenses of the glasses so that the stereoscopic optical components are positionally maintained in front of the lenses of the glasses,
wherein the stereoscopic frame has a stereoscopic bridge that connects the two stereoscopic rims, and
wherein the engagement section includes a stopper segment protruding rearward from the stereoscopic bridge and removable from the bridge of the frame of the glasses from above.

4. The stereoscopic glasses according to claim 3, wherein a rear section of each stopper segment is provided with a projection that is securable to the rim of the frame of the glasses or to the corresponding lens held by the rim, the projections being secured to the rim or the lenses so as to prevent forward movement of the stereoscopic optical components.

5. Stereoscopic glasses comprising:
a pair of left and right stereoscopic rims connected to each other and respectively holding stereoscopic optical components used when observing a stereoscopic image; and
a stereoscopic frame that includes stereoscopic temples extending rearward from the stereoscopic rims,
wherein the stereoscopic frame is provided with an engagement section that is brought into engagement with a rim or a bridge of a frame of glasses already worn by a user in a state where the stereoscopic optical components are positioned in front of the lenses of the glasses so that the stereoscopic optical components are positionally maintained in front of the lenses of the glasses,
wherein the stereoscopic frame has a stereoscopic bridge that connects the two stereoscopic rims, and
wherein the engagement section includes a single stopper segment protruding from upper rim segments of the two stereoscopic rims as well as from an upper edge of the stereoscopic bridge and removable from the rim of the frame of the glasses from above.

6. The stereoscopic glasses according to claim 5, wherein the stopper segment has a width such that the stopper segment extends within opposite outer ends of the two stereoscopic rims in a width direction, and wherein projections that are securable to the rim of the frame of the glasses or to the lenses held by the rim are provided near opposite ends, in the width direction, of a rear section of the stopper segment, the projections being secured to the rim or the lenses so as to prevent forward movement of the stereoscopic optical components.

7. Observation glasses comprising:
a pair of left and right observation rims connected to each other and respectively holding observation optical components used for observation; and
an observation frame that includes observation temples extending rearward from the observation rims,
wherein the observation frame is provided with an engagement section that is brought into engagement with a rim or a bridge of a frame of glasses already worn by a user in a state where the observation optical components are positioned in front of the lenses of the glasses so that the observation optical components are positionally maintained in front of the lenses of the glasses,
wherein the observation rims each have an upper rim segment that extends along an upper edge of the corresponding stereoscopic optical component, and
wherein the engagement section includes two stopper segments protruding rearward respectively from the upper rim segments of the stereoscopic rims and removable from the rim of the frame of the glasses from above.

8. The stereoscopic glasses according to claim 2, wherein the lenses are separated from the projections or the stereoscopic optical components.

9. The stereoscopic glasses according to claim 4, wherein the lenses are separated from the projections or the stereoscopic optical components.

10. The stereoscopic glasses according to claim 6, wherein the lenses are separated from the projections or the stereoscopic optical components.

* * * * *